United States Patent [19]
Kroitor

[11] Patent Number: 5,854,634
[45] Date of Patent: Dec. 29, 1998

[54] COMPUTER-ASSISTED ANIMATION CONSTRUCTION SYSTEM USING SOURCE POSES WITHIN A POSE TRANSFORMATION SPACE

[75] Inventor: Roman B. Kroitor, Arundel, Canada

[73] Assignee: Imax Corporation, Ontario, Canada

[21] Appl. No.: 578,293

[22] Filed: Dec. 26, 1995

[51] Int. Cl.$^6$ ................................................ G06T 13/00
[52] U.S. Cl. ............................................................. 345/473
[58] Field of Search ................................ 395/173–175, 395/119; 345/473–475, 419

[56] References Cited

U.S. PATENT DOCUMENTS

| | | | |
|---|---|---|---|
| 3,510,210 | 5/1970 | Haney | 352/39 |
| 4,189,743 | 2/1980 | Schure et al. | 348/577 |
| 4,600,919 | 7/1986 | Stern | 345/122 |
| 4,797,836 | 1/1989 | Witek et al. | 345/473 |
| 4,952,051 | 8/1990 | Lovell et al. | 352/87 |
| 5,029,997 | 7/1991 | Farouja | 352/54 |
| 5,237,647 | 8/1993 | Roberts et al. | 345/419 |
| 5,261,041 | 11/1993 | Susman | 345/473 |
| 5,325,475 | 6/1994 | Poggio et al. | 345/433 |
| 5,416,899 | 5/1995 | Poggio et al. | 345/475 |
| 5,454,371 | 10/1995 | Fenster et al. | 128/660.07 |
| 5,506,949 | 4/1996 | Perrin | 345/473 |
| 5,511,158 | 4/1996 | Sims | 345/440 |
| 5,590,261 | 12/1996 | Sclaroff et al. | 345/473 |
| 5,619,628 | 4/1997 | Fujita et al. | 345/427 |
| 5,623,428 | 4/1997 | Kunii et al. | 364/578 |
| 5,659,692 | 8/1997 | Poggio et al. | 345/330 |

FOREIGN PATENT DOCUMENTS

| | | |
|---|---|---|
| 314250 | 5/1989 | European Pat. Off. . |
| 633549 | 1/1995 | European Pat. Off. . |
| 2245807 | 1/1992 | United Kingdom . |
| 2258790 | 2/1993 | United Kingdom . |
| WO 09458 | 10/1989 | WIPO . |
| 9221095A1 | 11/1992 | WIPO . |
| WO94/18663 | 8/1994 | WIPO . |

OTHER PUBLICATIONS

Scull, "Bezier Curves on Groups", *Computers & Mathematics*, pp. 691–700, Sep. 1989.

Bartels et al., "Curve–to–Curve Associations in Spline–Based Inbetweening and Sweeping", *Computer Graphics*, v. 23, n. 3, pp. 167–171, Jul. 1989.

Bartels et al., "Speed Adjustment for key–Frame Interpolation", Graphics Interface '89, pp. 14–19, Jun. 1989.

Fishwick et al., "Using Discrete Event Modeling for Effective Computer Animation Control", 1991 Winter Simulation Conference Proceedings, Dec. 8–11, 1991, p. 1156–1164.

Rossignac, Jarek, "Solid–Interpolatiing Deformations: Construction and animation of PIPs", Eurographics '91, Sep. 2–6, 1991, KC16387 (#72685).

Parke, Frederic I., "Control Parameterization for Facial Animation," Computer Animation '91, Geneva, pp. 3–14, Jan. 1991.

Kaul, Anil and Rossignac, Jarek, Solid–Interpolating Deformations: Construction and Animation of PIPs, IBM Research Report RC 16387 (# 72685), Dec., 13, 1990.

(List continued on next page.)

*Primary Examiner*—Joseph R. Burwell
*Attorney, Agent, or Firm*—Bereskin & Parr

[57] ABSTRACT

A system and method for intuitively generating computer-assisted animation utilizes a transformation space in which a computer input device such as a three-dimensional drawing wand is moved to generated constructed poses from a plurality of source poses. The transformation space may be in the form of a tetrahedron with each of the four vertices representative of a source pose. At any point within the three-dimensional volume of the tetrahedron, a constructed pose may be defined based on weighted averages of the four source poses. The animator may create a sequence of animation simply by moving the drawing wand within the tetrahedron. The rate of change of the transformations of the constructed poses is controlled by the rate of movement of the drawing wand but may be altered after the sequence of constructed poses is defined.

58 Claims, 21 Drawing Sheets

OTHER PUBLICATIONS

Tomaso Poggio et al., "A Theory of Networks for Approximation and Learning", A1 Memo No. 1140, Artificial Intelligence Laboratory, MIT, Jul. 1989, pp. 1–84.

Tomaso Poggio et al., "Regularization Algorithms for Learning that are Equivalent to Multilayer Networks", *Science*, vol, 247, Feb. 23, 1990, pp. 978–982.

Tomaso Poggio et al., "Networks for Approximation and Learning," *Proceedings of the IEEE*, vol. 78, No. 9, Sep. 1990, pp. 1481–1497.

Tomaso Poggio et al., "A Network that Learns to Recognize Three Dimensional Objects", *Nature*, vol. 343, No. 6255, 1990, pp. 263–266.

Henry Bortman, "The Future of Type?", *MacUser* (Jul. 1991): 187–195.

Peter Litwinowicz, "Inkwell: A 2½ –D Animation System", *Computer Graphics*, 25(4): 113–121 (Jul. 1991).

Takeshi Agui et al., "Three Dimensional Computer Animation by Trigonometric Approx. to Aperiodic Motion", *Systems and Computers in Japan*, 19(5): 82–88 (May1988).

Mark C.K. Yang et al., "Automatic Curve Fitting with Quadratic B–Spline Functions and Its Applications to Computer–Assisted Animation", *Computer Vision, Graphics, and Image Processing*, 33(3): 346–363 (Mar. 1986).

Wilhelms; "Toward Automatic Motion Control", *IEEE Computer Graphics and Applications* Apr. 1987, vol. 7, No. 4, pp. 11–22.

Steketee et al., "Parametric KeyFrame Interpolation Incorporating Kinetic Adjustment and Phrasing Control", *Computer Graphics*, Jan. 1985, vol. 19, No. 3, pp. 255–262.

Sturman, "Interactive KeyFrame Animation of 3–D Articulated Models", *Proceedings of Graphics Interface '84*, 1984, pp. 35–40.

Burtnyk, Nestor et al., "Computer Assisted Film Animation", *Bulletin of the Radio and Electrical Engineering Div.*, Natural Research Council of Canada, Sep. 1970, pp. 8–12.

Wein, Marceli et al., "Computer Graphics and Film Animation",*Bulletin of the Radio and Electrical Engineering Div.*, Natural Research Council of Canada, Apr. 1969, pp. 39–42.

Burtnyk, Nestor et al., "Computer–Generated Key–Frame Animation", *Journal of the Society of Motion Picture and Television Engineers*, 80(3):pp. 149–153, (Mar. 1971).

Wein, Marceli et al., "A Computer Facility for Film Animation and Music", *Canadian Computer Conference Session*, pp. 2122–2125, (Jun. 1971).

Burtynk, Nestor et al., "Towards a Computer Animating Production Tool", *Eur Comput Congr Proc*, pp. 171–185, (May 13–17, 1974).

Burtnyk, Nestor et al., "Interactive Skeleton Techniques for Enhancing Motion Dynamics in KeyFrame Animation", *Communications of the ACM*, pp. 564–569, (Oct. 1976), v. 19, n. 10.

Autodesk Previews Biped "Super Plug–In" for 3D Studio MAX; First Core Component Enables Lifelike, Free–Form Animation of Any Two–Legged Character, *Business Wire*, Aug. 8, 1995.

Simone, Luisa, "The motion is in the message: 2–D animation software",*PC Magazine*, Aug. 1992, p. 435, v. 11, n. 14.

Emmett, Arielle, Cartooning in France: french animators opt for faster production processes, affordable creativity, Computer Graphics World. Jul. 1989, p. 97, v. 12, n. 7.

MacNichol, Gregory, "Animating Motion—Recent Advances in Motion Control Produce Realistic Effects with Less Difficulties", *Computer Graphics World*, Sep. 1988, p. 44–.

Kochanek, Doris and Bartels, Richard H., "Interpolating Splines with Local Tension, Continuity, and Bias Control", *Computer Graphics*, Jul. 1984, pp. 33–41.

Booth, Kellogg S., Kochanek, Doris H. and Wein, Marceli, "Computers animate films and video", *IEEE Spectrum*, Feb. 1983, pp. 44–51.

Reeves, William T., "Inbetweening for Computer Animation Utilizing Moving Point Constraints", *Computer Graphics*, Aug. 1981, pp. 263–269.

Durand, Charles X., "Automated computing: is the hand quicker than the computer?", Computer Graphics World, Mar. 1990, p. 156.

Dilg, Brian, "AT&T Graphics Software Labs: Crystal 3D 3.52", *PC Week*, Jul. 29, 1991, p. 72.

Dilg, Brian, "Autodesk Inc.: 3D Studio 1.01",*PC Week*, Jul. 29, 1991, p. 73.

Dilg, Brian, "Lazerus: Radiant/PC",*PC Week*, Jul. 29, 1991, p. 78.

McQuillin, Lon, "Authoring, modeling and animation", *MacUser*, Feb. 1991, p. S52.

MacNichol, Gregory, "A Market in Motion", *Computer Graphics World*, Jun. 1991, pp. 66–77.

MacNichol, Gregory, "Rolling Your Own", *Computer Graphics World*, Jun. 1991, pp. 78–86.

Kochanek, Bartels, R. and Booth, K.S.,*A Computer System for Smooth Keyframe Animation*, pp. 28–85.

Steketee, Scott N. and Badler, Norman L., "Parametric Keyframe Interpolation Incorporating Kinetic Adjustment and Phrasing Control", *SIGRAPH '85*, pp. 255–262, Jul. 1985.

Foley, James, D., van Dam, Andries, Feiner, Steven K. and Hughes, John F., *Computer Graphics—Principles and Practice*, Aug. 1990, pp. 1057–1081, 491–517.

Schmandt, Christopher, Interactive three–dimensional computer space, SPIE vol. 367 Processing and Display of Three–Dimensional Data (1982).

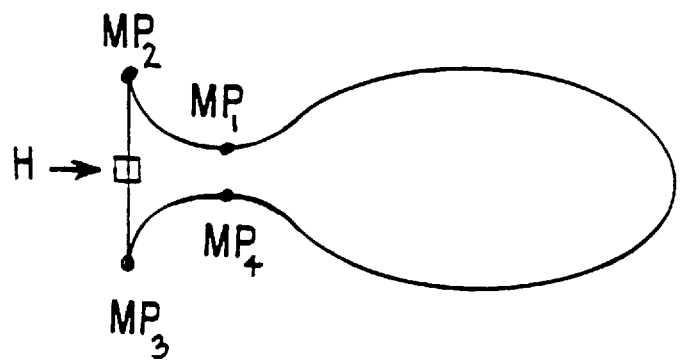
FIG. 12a
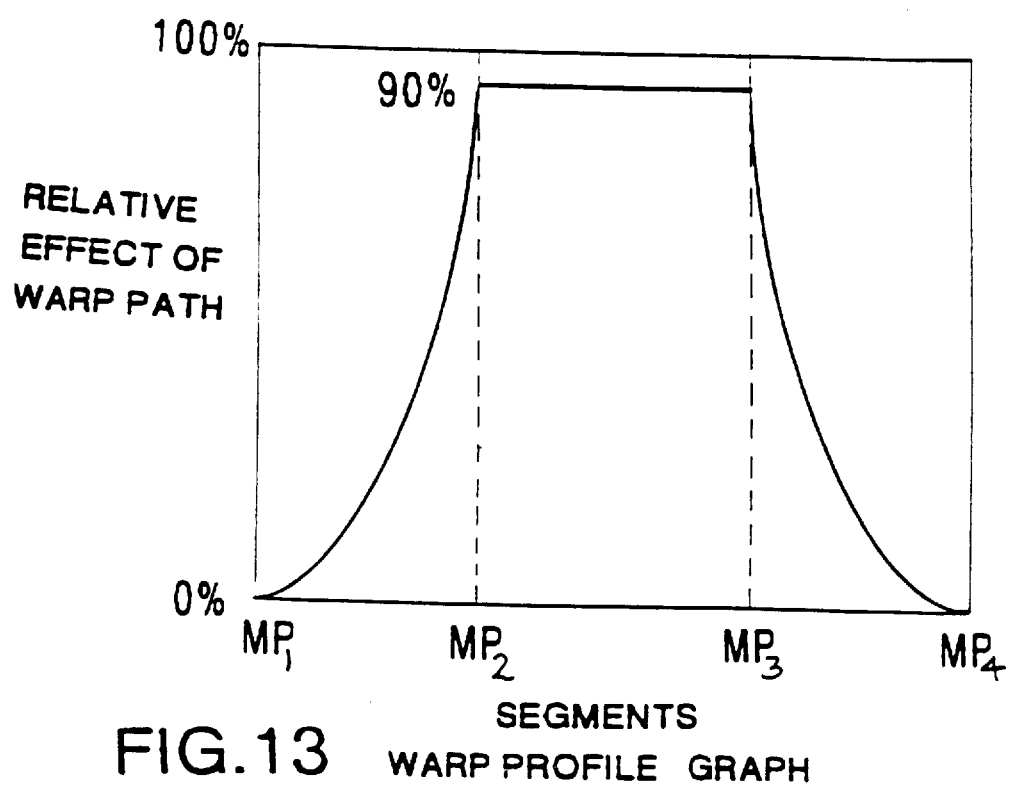
FIG. 13  WARP PROFILE GRAPH

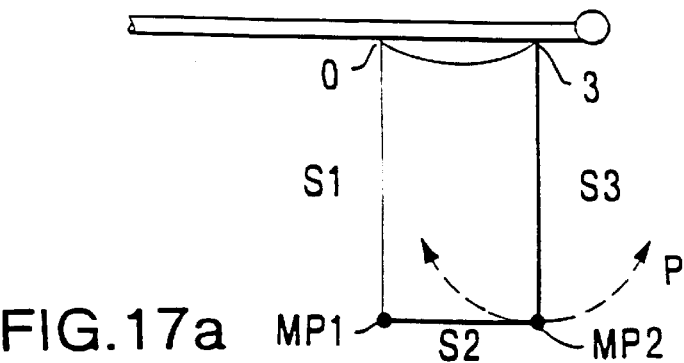
FIG.17a
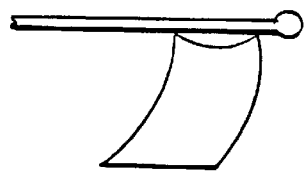
FIG.17e
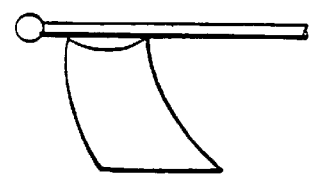
FIG.17f
WIND PATH
FIG.17c
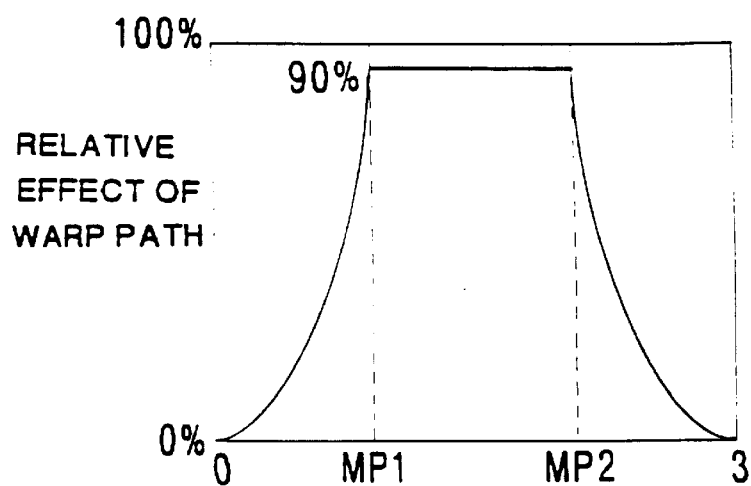
FIG.17b
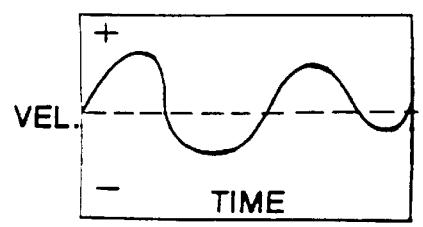
FIG.17d

COMPUTER-ASSISTED ANIMATION CONSTRUCTION SYSTEM USING SOURCE POSES WITHIN A POSE TRANSFORMATION SPACE

FIELD OF THE INVENTION

This invention relates to a system and method for creating two and three-dimensional computer-assisted animation, and a simple and intuitive user interface for generating a series of animation images from a relatively few source drawings.

BACKGROUND OF THE INVENTION

The field of animation concerns the creation of the illusion of motion by rapidly displaying a sequence of still images, with each image slightly changed from the previous image. In the early years of animation, the drawings were strictly made by hand, which is a tedious and time-consuming process given the large number of drawings required for even a short animation segment. More recently, with the advent of computer graphics technology, computers have been used in the animation process. Animators are often reluctant, however, to depend too heavily on computers for generating drawings because of the noticeable difference between hand drawn figures and objects and computer-generated figures and objects, which appear robotic rather than life-like.

More accepted in the animation field are computer systems permitting animators to create drawings on computer display devices using a mouse, drawing tablet or other input device rather than pen and paper. In these systems, computers are often used to assist an animator in creating an animation sequence by generating intermediate animation frames which are placed in between frames drawn by the animator. The frames drawn by the animator are referred to as key frames or poses. The computer generated intermediate frames are referred to as "in-between" frames and are used to transform an image from one key pose to another. The process of generating these in-between poses is often referred to as "tweening" or "in-betweening." Generation of the in-between poses is based on computer interpolation between the animator's key frames. The animator specifies the number of in-between frames based on the complexity of the motion, and the computer generates the in-between frames to create a smooth transformation in the resulting animation sequence. The advantage of this technique is that it eliminates the laborious task of manually generating the individual in-between frames. Computer in-betweening for three-dimensional animation is discussed in U.S. Pat. No. 4,600,919 to Stern.

Prior art computer tweening methods are lacking in several respects. First, some prior art tweening systems use simple linear interpolation to generate intermediate poses between key frames. One problem with this approach is that it results in actions in objects that appear "robotic." The problem can be minimized by increasing the number of key poses, but this requires more manually generated drawings and defeats the purpose of computer-assisted tweening. Another problem is that linear interpolation can cause distortion of objects experiencing rotational motion by shortening segments of the objects at certain angles of rotation. A third problem is that discontinuities in the speed of motion often result if i) the number of in-betweens in adjacent intervals is constant, but the distance between key poses is not, or ii) the distance between adjacent key positions is equal but the number of in-between poses in the interval are not. These problems are discussed more fully in D. H. U. Kochanek, R. Bartels, and K. S. Booth, "A Computer System for Smooth Keyframe Animation," Rep. No. CS-82-42, University of Waterloo Computer Science Dept., 1982.

Several researchers have developed improvements to the simple linear interpolation technique as discussed in Kochanek et al. One such technique is referred to as the "P-curve." In this process, the animator traces out a motion path along which an object is to move. In addition, to account for transformations in the object as it moves, the animator can specify a selection function to designate which picture of an object is used for any given frame along the P-curve. For example, the object can be a bouncing ball and the animator can specify that as the ball bounces, a drawing showing a compressed ball can be used.

These prior art techniques are cumbersome for animators to use, however, because they are complicated and do not provide a simple, easy-to-use user interface. There is thus a need for a computer-assisted animation construction system and method that permits an animator to create high quality animation simply and intuitively.

SUMMARY OF THE INVENTION

It is an object of the present invention to provide an improved system and method for computer-assisted generation of animation.

It is a further object of the present invention to provide an improved system and method for computer-assisted generation of animation that creates animated actions more life-like as compared with prior art systems.

It is a further object of the invention to provide an improved system and method for computer-assisted generation of animation such that the animator can simply and intuitively in real-time create a sequence of motion using a plurality of animator-created source poses of an object.

It is a further object of the invention to provide animators with direct artistic control of computer-assisted three-dimensional hand-drawn animation, equal to that which they have when hand-drawing two-dimensional animation in the traditional manner.

The system and method of the present invention improves on the known concept of using a computer to interpolate between sequential key poses of an animation sequence through the use of what are referred to herein as "source poses." A source pose is an animator-created drawing of an object used in the present invention to create computer-generated poses of the object for animation. Unlike the prior art concept of key poses, a source pose may, but is not required to be, part of the animation.

The invention has application to both two and three-dimensional computer animation. In the system and method of the present invention, any number of source poses can in theory be specified by the animator, but practically 1–7 source poses would be used. These source poses do not necessarily correspond identically to the appearance of the animated object in any of the resulting animated poses. The source poses are used to construct composite poses used in animation sequences, referred to herein as "constructed poses." In each constructed pose, the object's appearance is constructed from a weighted average of the source poses. A three-dimensional drawing space is provided using a computer-driven stereoscopic viewing system incorporating a computer input device such as a three-axis (6 degree of freedom) position sensor or drawing "wand" which utilizes sensors to track the movement and orientation of the wand in three-dimensional space. The position of the wand is represented by a cursor which is displayed within the three-dimensional drawing space.

A predetermined portion of the three-dimensional drawing space, referred to herein as the "pose transformation space," is displayed in the viewing system. In one embodiment, the pose transformation space is a tetrahedron. In this case, four source poses are represented by the tetrahedron, one at each vertex. Each point within the tetrahedron represents a constructed pose defined by a unique combination of the four source poses. The drawing wand is moved to control the movement of the wand cursor within the tetrahedron in order to define the transformation of the animated object. The position of the wand cursor relative to each vertex of the tetrahedron controls the constructed pose at that point in time. The constructed poses are composed of weighted averages of the source poses. The constructed poses are viewed in real-time as the wand cursor moves within the pose transformation space enclosed by the tetrahedron, thus providing instantaneous feedback to the animator of the action being created or "scripted."

In this manner, an animated object can be made to perform any action which, given the nature of the four source poses, can be specified by a progression of three-dimensional graph points determined by the path of the wand in the pose transformation space, referred to herein as a "transformation graph. " In addition, the velocity of the pose transformation may be controlled by the rate of motion of the wand cursor in the pose transformation space. Alternatively, the velocity may be independently controlled by displaying a graphical representation of the relative rate of transformation as a function of position along the transformation graph—referred to herein as a "velocity profile graph" or velocity profile for the transformation—to specify the instantaneous rate of transformation. This velocity profile permits an animator to modify the rate of transformation along the transformation graph using the input device.

The actions of different characters and objects and parts thereof may be defined using different transformation graphs, thus providing independent control over the action of the characters in a resulting animation sequence. If less than four source poses are to be used by the animator, a two-dimensional transformation space may be used (e.g, a triangle for three source poses).

A second aspect of the present invention is directed to further modifying constructed poses to provide for greater control over the form and action of computer-generated animated images undergoing some form of motion or transformation, which may be specified as a distortion or "warp" of one or more line segments of a drawing. A point within the drawing is chosen as a reference point, referred to herein as a "warp handle," which will typically be on a line segment of a source pose, but need not be so located. A motion path relative to this reference point—referred to herein as a "warp path"—is then drawn in the drawing space. The warp path defines a motion path in time relative to the reference warp handle, thus generating a set of relative x, y, and z displacements as a function of time. The line segment or segments to be modified by the warp path are then specified by any one of a number of methods, such as pointing and clicking with the drawing wand. In addition, a graph is drawn which defines the degree to which the successive points on the line segment or segments are displaced by the warp path. This graph is referred to herein as a "warp profile graph." The set of relative displacements is then applied to the designated segments, as modulated by the warp profile graph. This general technique, referred to herein as "segment warping," may be modified to create various effects, such as the effect on an object of wind, of inertia, and to create the movement of a wave along the specified segments.

A third aspect of the present invention, referred to herein as "spine warping," creates a number of related segment warps simultaneously. This is accomplished by defining, on each source pose, a single, straight line "spine" extending approximately through the centerline of a group of line segments to be warped. Any of the above-described warps may be applied to the spine and the resulting warp of the spine is appropriately transferred to each point on each of the affected line segments in the group. This provides the animator with a tool for very simply specifying complicated transformations to groups of line segments simultaneously.

A final aspect of the present invention relates to the automatic painting of closed loops (which may represent a surface of an object in a stereoscopic viewing system) drawn in two or three-dimensional space by "flood-filling" the loop (each of the two-dimensional left and right eye projections of the loop in a stereoscopic system). Flood-filling is a technique known in the art of computer graphics. The system and method of the present invention uses a different technique for painting closed loops, referred to herein as "fill masking." In accordance with the present invention, the animator need only define the color with which the loop is to be filled in a single source pose and the color is maintained in each constructed pose regardless of the distortions the loop undergoes during motion. For each such constructed loop, a two-dimensional geometric shape, which is typically a rectangle, is generated automatically to encompass the loop by making it slightly larger than the loop based on the minimum and maximum x and y coordinates of the loop. The entire rectangle is generated in the fill color of the loop chosen by the animator. Next, the loop outline is transferred to the rectangle in its chosen line color or colors. A "fill" of the area bounded by the rectangle and the line forming the exterior of the loop is then performed, using the traditional flood-fill technique. This filled area is defined to be transparent so that when the resulting rectangle is displayed, the viewable image consists only of the loop in the appropriate filled color. This process is automatically repeated for each of the filled loops which comprise the complete character or object animation.

BRIEF DESCRIPTION OF THE DRAWINGS

FIGS. 12(a)–(b) illustrate the segment warp technique of the present invention.

FIGS. 13 illustrates a warp profile graph used for the segment warps shown in FIG. 12(a).

FIG. 17(a)–(f) illustrate the wind effect that can be achieved using a variation of the segment warp of the present invention.

DETAILED DESCRIPTION OF THE INVENTION

Figure 1A:
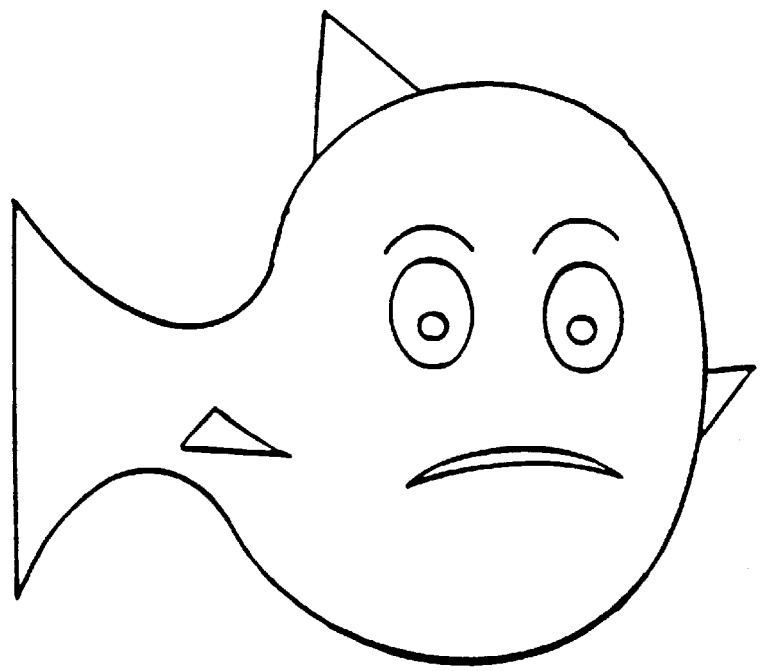
FIGS. 1(a)–(d) illustrate four source poses of a fish for use in an animation sequence.
Figure 1C:
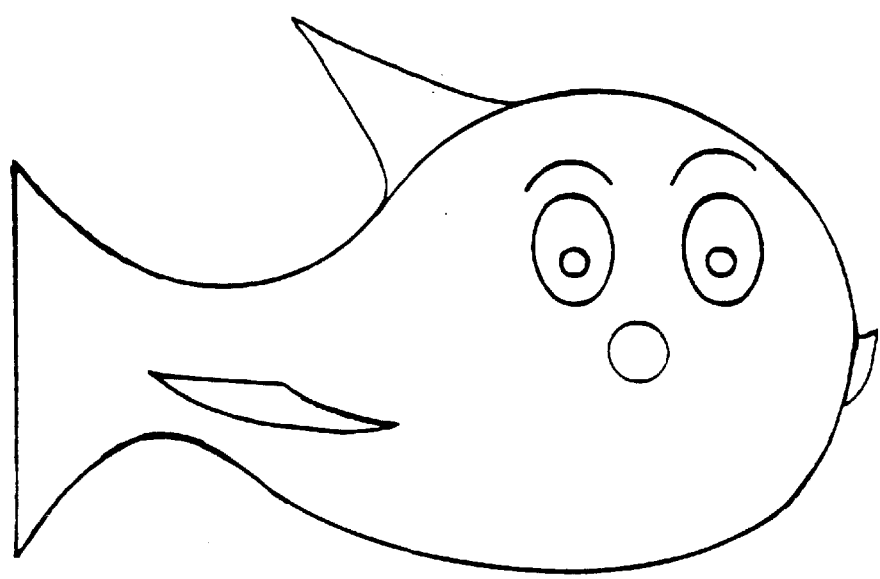
Figure 1B:
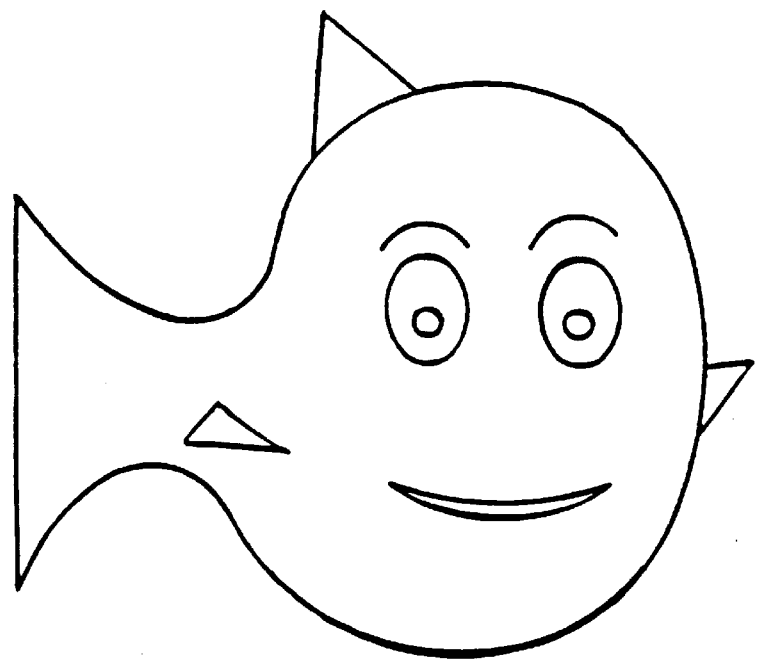
Figure 1D:
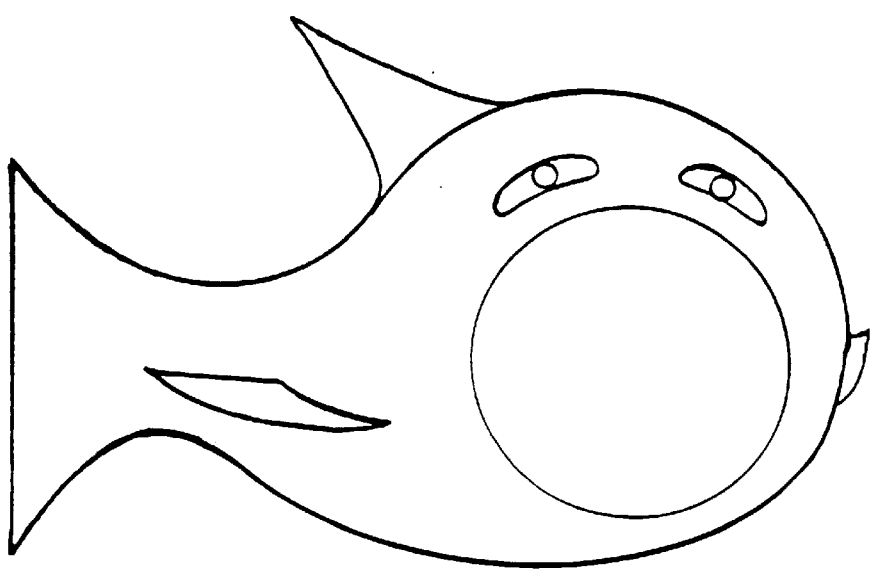
Figure 2A:
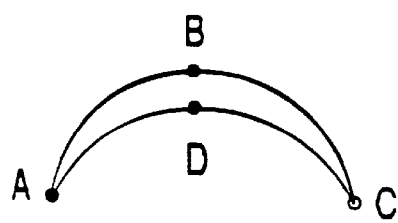
FIGS. 2(a)–(d) illustrate the four source poses of the fish's mouth of FIG. 1.
Figure 2B:
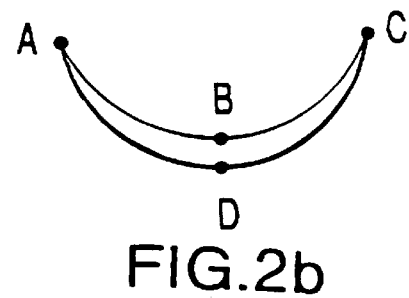
Figure 2C:
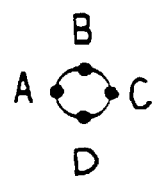
Figure 2D:
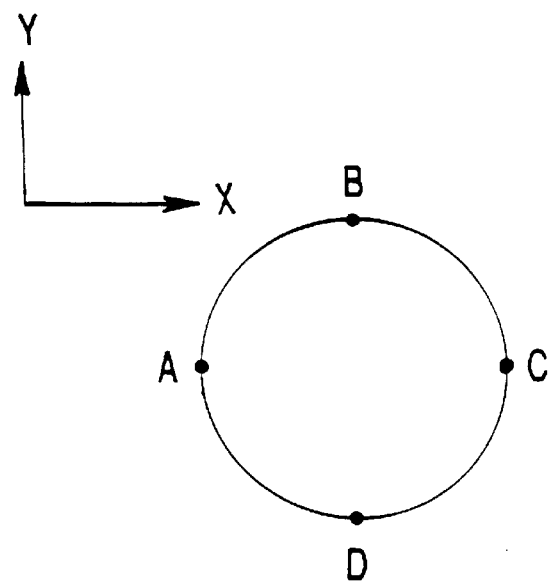

The invention utilizes computer systems for drawing and viewing stereoscopic (three-dimensional) images and applies such systems to the field of computer-assisted animation. Systems for drawing in three-dimensional space are known in the art of computer graphics. One example of such a system is described in Schmandt, C., "Interactive Three-dimensional Computer Space," SPIE Vol. 367, pp. 155–59 (1982). The system described therein utilizes an ordinary CRT display monitor which is viewed by the user through a half-silvered mirror placed at a 45° angle with the monitor. The user is provided with a three-dimensional drawing space beneath the mirror and a "wand" for drawing in the three dimensional space. The wand used in the described system utilizes magnetic position sensing technology to provide its x, y, and z position as well as its attitude. The three dimensional (stereoscopic) effect is achieved by the user viewing the CRT through special glasses utilizing lead lanthanum zirconate titanate (PLZT) ceramic wafers which function as electrically operated shutters. The left and right eye views are effectively time-multiplexed by displaying them on alternate raster scans. The operation of the glasses is synchronized with the video signal to allow one eye at a time to view the proper image on the CRT providing the three-dimensional effect. This technique is sometimes referred to as field sequential three-dimensional imaging.

An alternate means for providing a three-dimensional view is through the use of anaglyph (two color) left and right eye image separation. A limitation of this implementation is that the drawn images are monochrome, whereas the field sequential technique allows for color images. A third means for providing left and right eye image separation is through the use of polarizing filters where the left eye image is polarized one way and the right eye image polarized another. The polarized images are normally viewed by projecting them onto a screen and viewing them through appropriately polarized glasses.

Although the invention has application to both two and three-dimensional computer-assisted animation systems, the invention will be described herein with regard to three-dimensional animation. It will be readily apparent to those of ordinary skill in the art that the same concepts may be applied to standard two-dimensional animation.

The present invention requires a three-dimensional stereoscopic viewing system using one of the above techniques to permit the animator to draw directly in three-dimensional space. In a preferred embodiment, the three-dimensional drawing and viewing system utilizes a computer workstation monitor and field sequential left and right image separation using synchronized liquid crystal shutter glasses.

The animator uses an electromechanical device referred to as a drawing "wand" to draw the three-dimensional drawings. The wand is actually a three-dimensional location tracker, which is available from several suppliers, including Ascension Technologies, Inc. In one embodiment of the present invention, a drawing wand referred to as the "Flock of Birds" by Ascension is used. The device uses electromagnetic waves to provide its position and orientation in three-dimensional space. Liquid crystal shutter glasses are available from, among others, Stereographics Corp. A high resolution 17-inch monitor by Nanao has been found to the best from the standpoint of image resolution and stability as well as ease of use. When the user moves the wand in space a cursor moves within the drawing space under control of the wand and when a button on the wand is pushed, a continuous line in three-dimensional space following the path of the cursor is drawn. The line is composed of a series of closely-spaced points joined by very short line vectors to form what appears to be a single, continuous smooth line. It is important that the system provide for vector-based as opposed to bit-mapped drawings, so that the line segments drawn by the animator may be mathematically defined and processed by the computer.

The present invention relates more specifically to several novel ways for transforming only a few drawings to create animation sequences. The invention incorporates several techniques for creating computer-assisted animation that are simple for an animator to use and provide the animator with control over the form and motion of animated objects that is lacking in existing computer animation systems.

In general, animation consists of the transformation of images in time to create the appearance of motion. The invention discloses several techniques for generating transformations in a manner that is simple and intuitive to use for an animator, and which also provides the animator with a great degree of control over the way in which images are transformed in order to provide realistic, life-like motion.

The first aspect of the invention relates to a concept referred to as transformation graphs which permit the animator to simply and intuitively generate different, computer-constructed poses of animated objects based on source poses drawn by the animator. A three-dimensional transformation graph may be implemented as follows (although two-dimensional graphs may also be used). The animator is provided with an image through the three-dimensional viewing system of a polyhedron, such as a tetrahedron. The tetrahedron is shown in the three-dimensional drawing space using well-known techniques for generating and displaying left and right eye two-dimensional images to create a three-dimensional effect. The tetrahedron displayed is only a guide for the animator and does not become part of the drawings used in the animation. Each of the four vertices of the tetrahedron is defined to represent a source pose hand-drawn by the animator. Each source pose consists of a vector-drawn representation of an animated object or portion of an object. Alternatively, source poses may be generated by prior-art computer animation systems and utilized in the present invention.

For example, four poses of a figure can be drawn, each with different positions of the legs. The four poses may then be represented at each of the four vertices of the tetrahedron. These four poses themselves are not sufficient to realistically represent motion. A sufficient number of poses to create realistic motion are constructed from these four poses. These constructed poses are based on composites of the four source poses. The constructed poses are defined by the animator by moving the wand in the three-dimensional space within the tetrahedron, referred to as the pose transformation space. The motion of the wand is tracked in time as it is moved within the tetrahedron and a three-dimensional graph of the wand's position traced out within the pose transformation space is generated. Each point on the graph represents a pose constructed from the four source poses. The number of points depends on the sampling rate of the drawing wand. The generation of constructed poses in this manner provides for continuous transformations of images in a manner simple for the animator to use. The animator "scripts" the action of a character or object simply by moving the wand cursor within the transformation space.

The graphs so created are referred to as transformation graphs because they define a continuously transforming series of poses constructed from the source poses. Different actions of the figure can be generated by different paths of the wand cursor in the transformation space. For example, with one set of four source poses with different positions of the legs, the figure referred to above can be made to "mark time," walk forward, walk backward, walk with big steps, little steps, etc., and these actions can be continuously created in any sequence simply by manipulating the wand. The transformation graphs are generated as follows. Using the example of a tetrahedral drawing space, at each point along the transformation graph, the constructed pose associated with the point is defined by the location of the point in space relative to the four vertices of the tetrahedron. The closer the point is to a vertex, the more the source pose assigned to the vertex will affect the appearance of the constructed form. In one embodiment, a simple linear weighting scheme is used so that the weight of each vertex or source pose is inversely proportional to the distance from the graph point to the vertex. For example, if a graph point is, in three-dimensional space, a distance x away from the first vertex (v1), 2x from the second (v2), 3x from the third (v3), and 4x from the fourth (v4), each of the four source poses associated with the four vertices will be weighted accordingly. In other words, the points defining the line segments of the constructed pose will be placed in accordance with a weighted average of the positions of the points in each of the four source poses. It should be noted that, utilizing the transformation graphs of the present invention, the source poses need not actually be part of the resulting motion sequence, which may utilize only composites of the source poses. In other words, the transformation graph need not anywhere touch a vertex. It should also be noted that, unlike the key poses of prior transformation techniques, there is no predefined time sequence for the poses. The transformation graph can move through any path in the pose transformation space in any sequence desired by the animator.

In a preferred embodiment, the tetrahedron is modified so that each edge is not a straight line but the arc of a circle centered at an opposite vertex and with a radius equal to the length of one side of the tetrahedron. The reason for this is as follows. Each vertex represents, by definition, a source pose, so that the weight of any of the other three vertices is defined to be zero at that vertex. In other words, the contribution of a source pose goes to zero when the distance of the vertex to which that pose is assigned to the point on the transformation graph is equal to the length of an edge of the tetrahedron. If an edge of the tetrahedron is traversed, the resulting constructed pose will be composed primarily from the two vertices at each end of the edge. However, the remaining two vertices will have non-zero effects because the distance to these vertices will diminish as the edge is traversed. Thus, it would not be possible to script a motion sequence constructed from only the two source poses represented by the two vertices at each end of the edge. Although in most cases the contributions of the other two vertices might not be noticeable in the resulting animation, any such potential problem is solved by utilizing the circular arcs in order to maintain a constant distance from each of the two non-contributing vertices as a path between the two vertices at the ends of the arc is traversed. It will be apparent to those of ordinary skill in the art that the shape of the transformation space need not be exact as it is only intended to be a guide for the animator in scripting action sequences. The system may readily be programmed so that if, for example, the animator moves the wand slightly inside or outside the tetrahedron as opposed to following precisely along the edge, it will be recognized as motion that is comprised only of the two source poses at the vertices.

Figure 3:
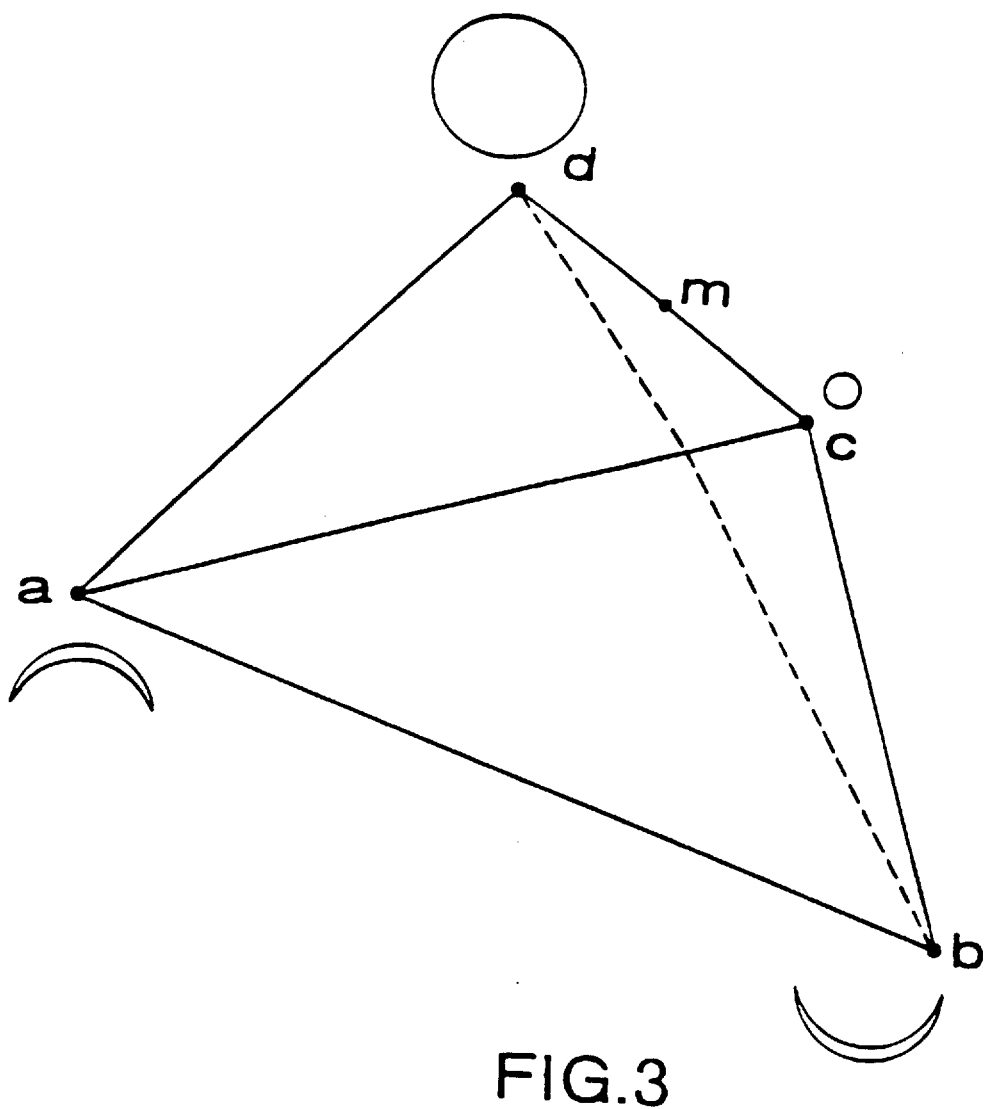
FIG. 3 is a three-dimensional tetrahedral pose transformation space used to generate the transformation graphs of the present invention.

The transformation graph aspect of the invention may be further described with reference to the figures. FIGS. 1(a)–(d) illustrate four possible configurations for the facial expressions of an animated fish. For clarity, the fish is drawn without illustrating the z-component and therefore appears two-dimensional, but is meant to depict a fish in a three-dimensional stereoscopic drawing. As can be seen in FIG. 1, there are four different source poses for the fish's mouth as shown in FIG. 2—frown (FIG. 2(a)), smile (FIG. 2(b)), small mouth (FIG. 2(c)), and big mouth (FIG. 2(d)). In each of FIGS. 2(a)–2(d), four points, A–D are shown. Each of the four source poses of the mouth may be assigned to one of the vertices (labelled a, b, c, and d) of a tetrahedron shown in FIG. 3 consisting of four planes: abc, bcd, acd, and abd. For example, at a point m midway along the line cd, the constructed pose defined by this point (a medium-sized mouth) will be formed primarily from the source poses at vertices c (small mouth) and d (large mouth). Each of the points A,B,C, and D in FIGS. 2(c) and 2(d) (as well as all the points along the line segment) will be mapped to a location (x,y coordinate) approximately midway between their locations at the vertices c and d.

Figure 4:
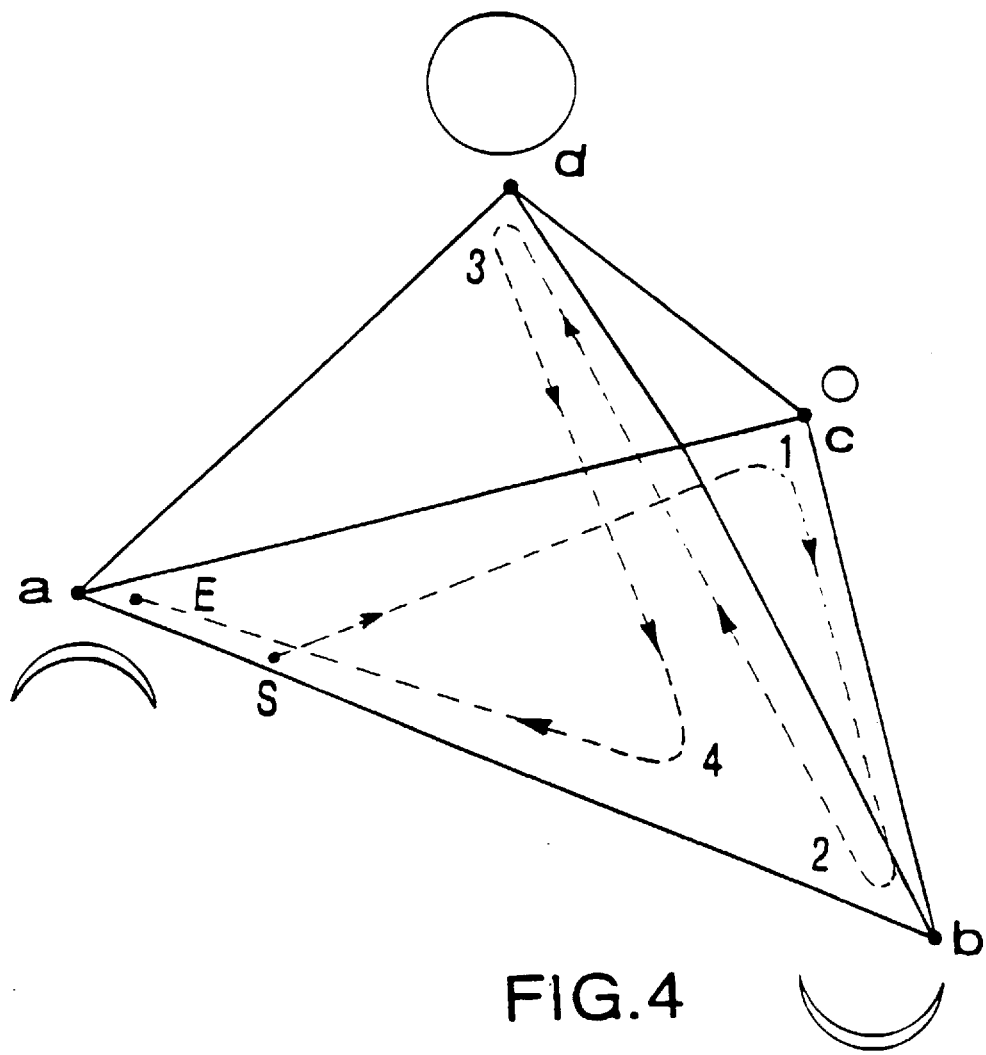
FIG. 4 is a transformation graph of the present invention for the mouth of a fish drawn in the pose transformation space of FIG. 3.
Figure 5:
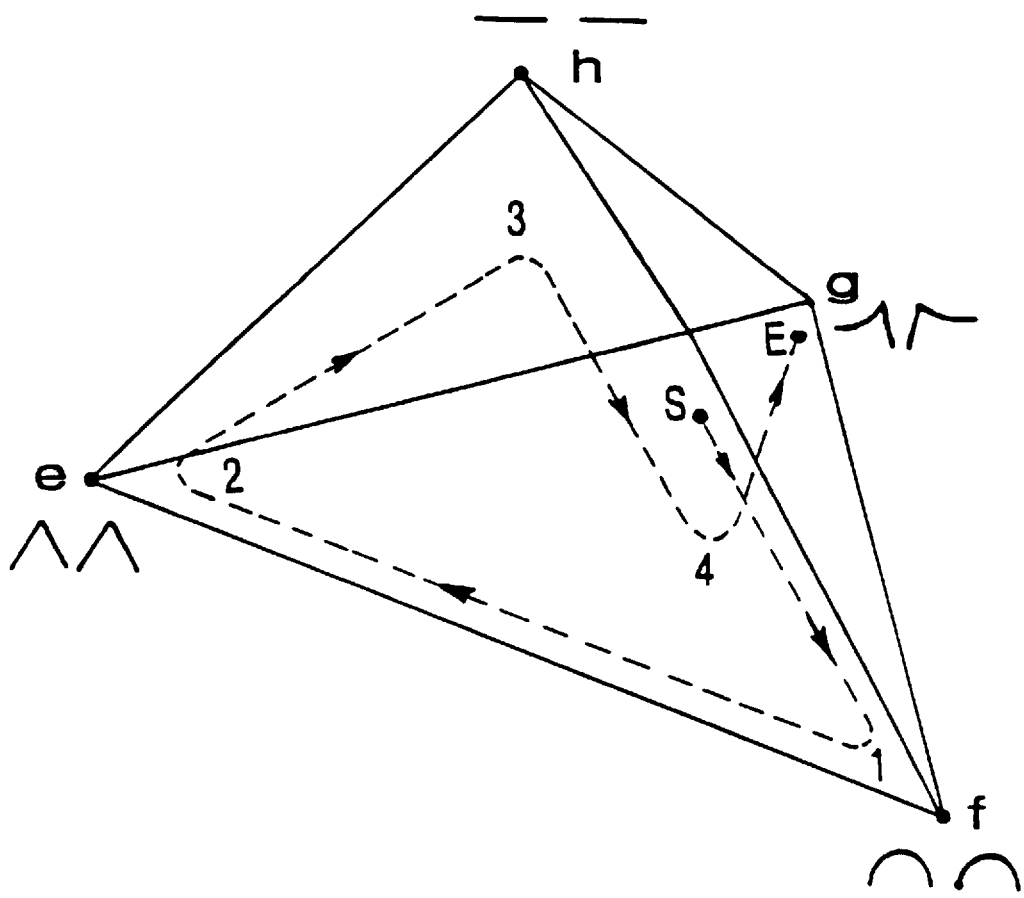
FIG. 5 is a transformation graph of the present invention for the eye brows of a fish drawn in a three-dimensional tetrahedral pose transformation space.
Figure 6:
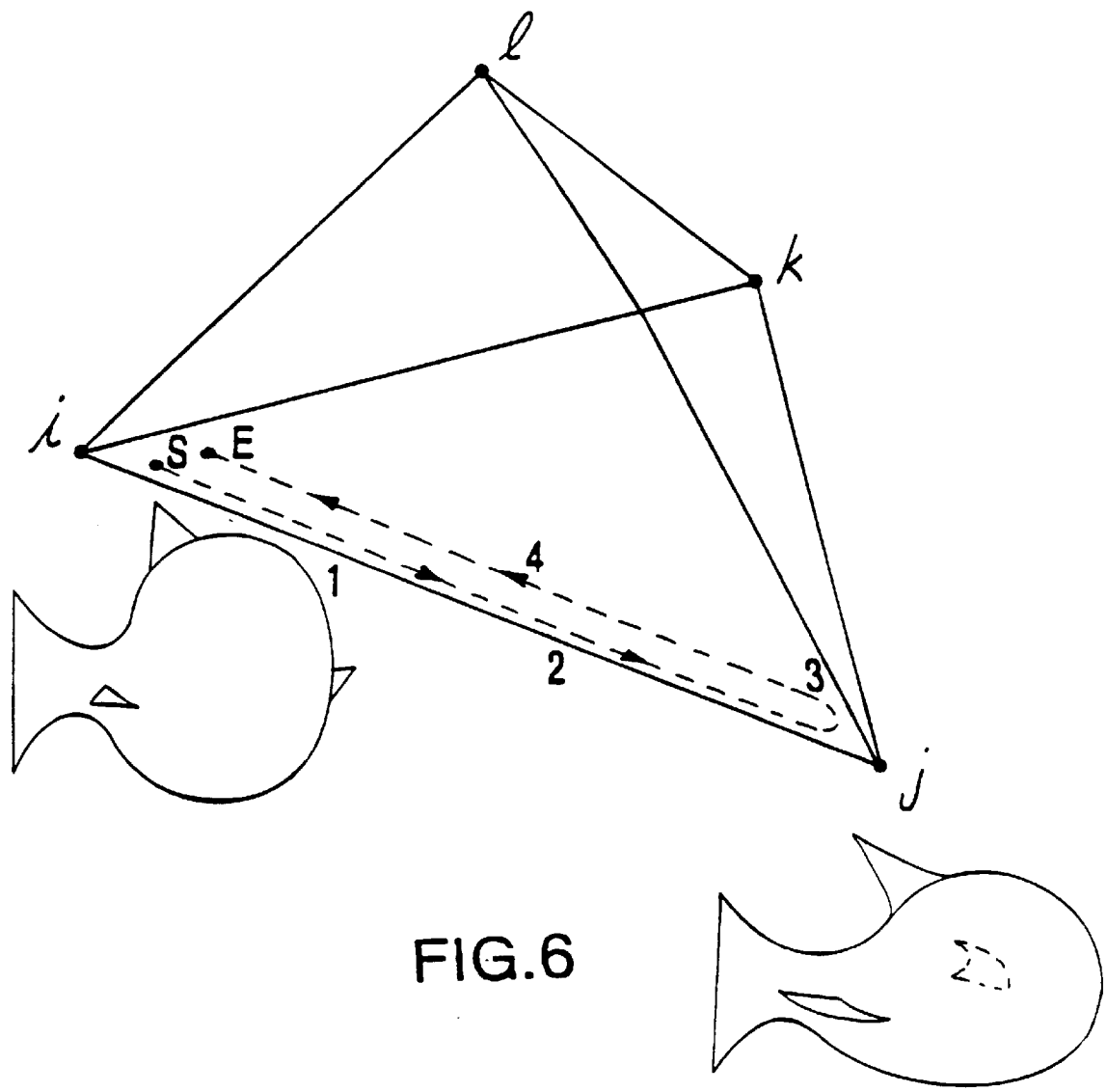
FIG. 6 is a transformation graph of the present invention for the body and fins of an animated fish, using only two vertices for a three-dimensional tetrahedral pose transformation space.
Figure 7:
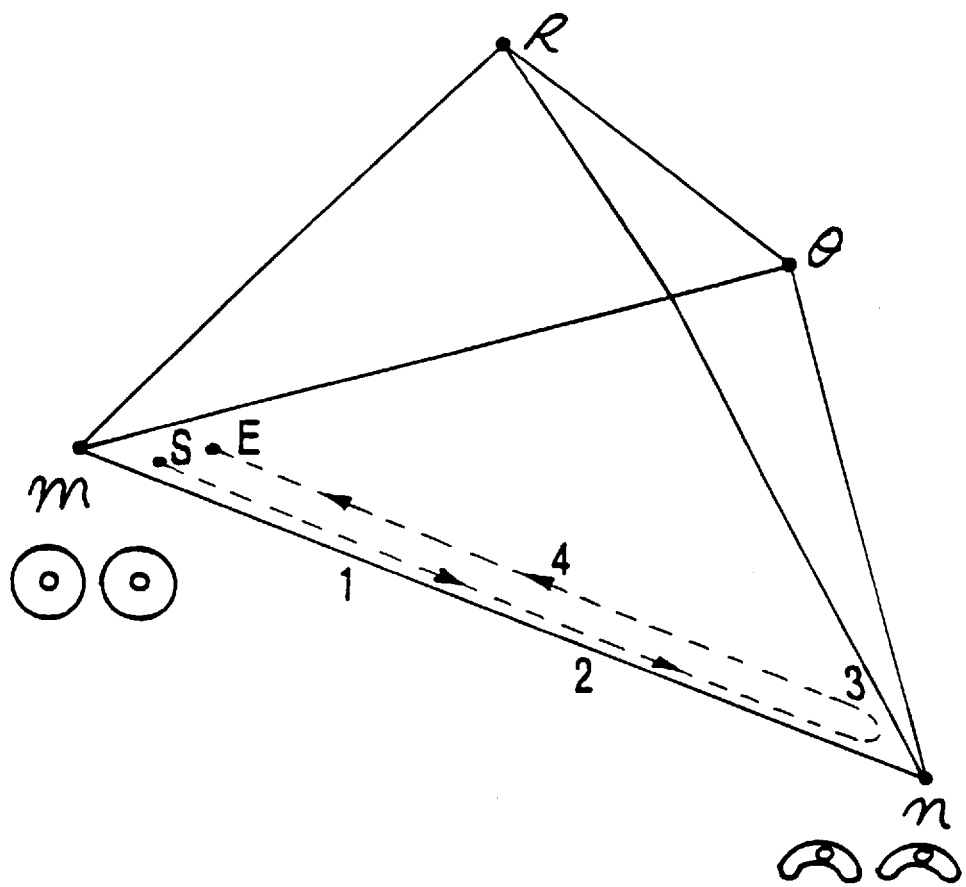
FIG. 7 is a transformation graph of the present invention for the eyes of an animated fish, using only two vertices for a three-dimensional tetrahedral pose transformation space.
Figure 8A:
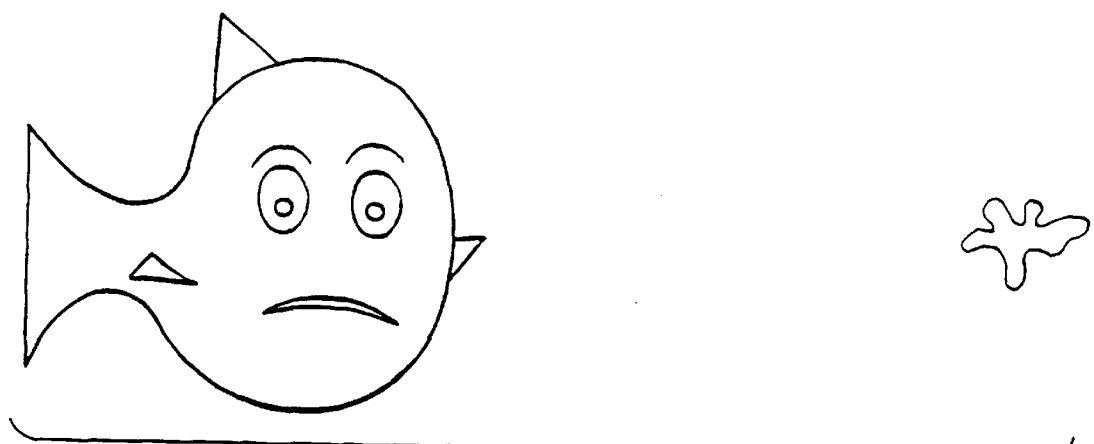
FIGS. 8(a)–(f) illustrates the animation frames resulting from the combination of the transformation graphs of FIGS. 4, 5, 6 and 7.
Figure 8B:
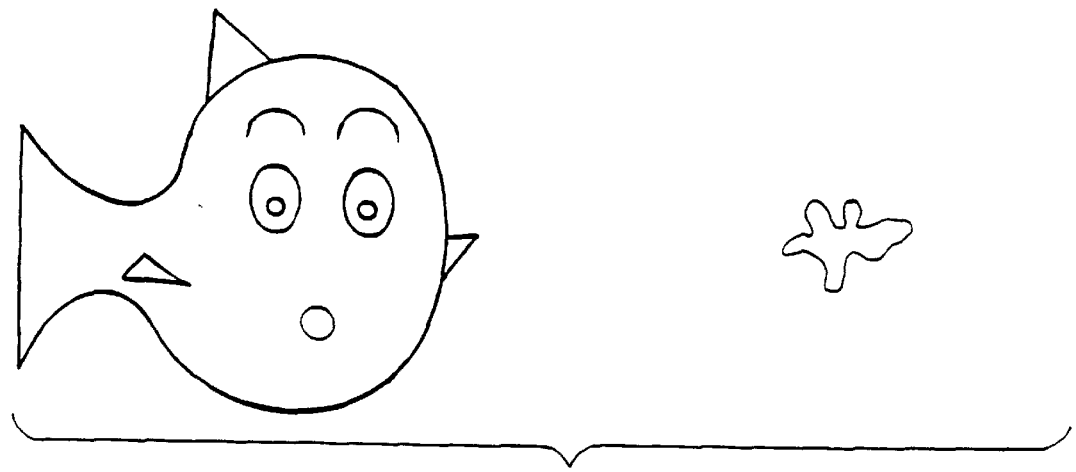
Figure 8C:
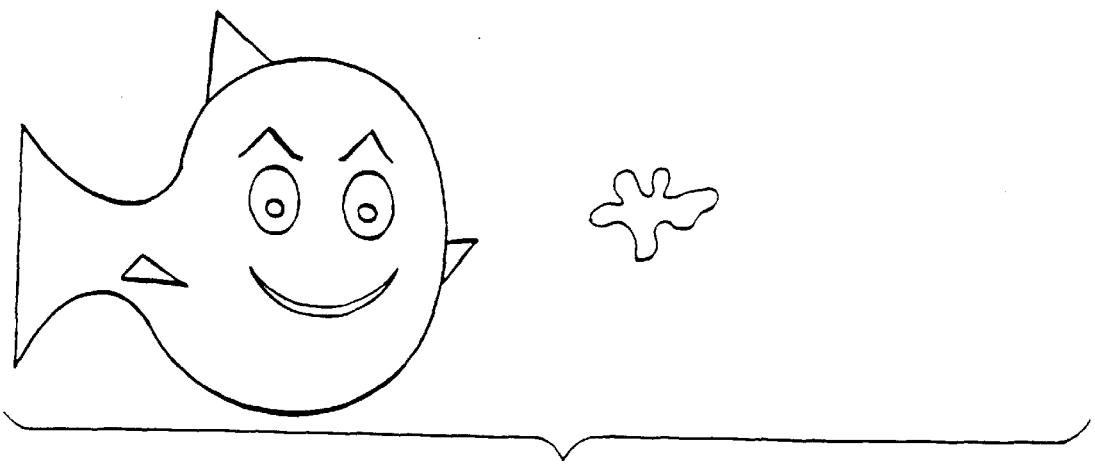
Figure 8D:
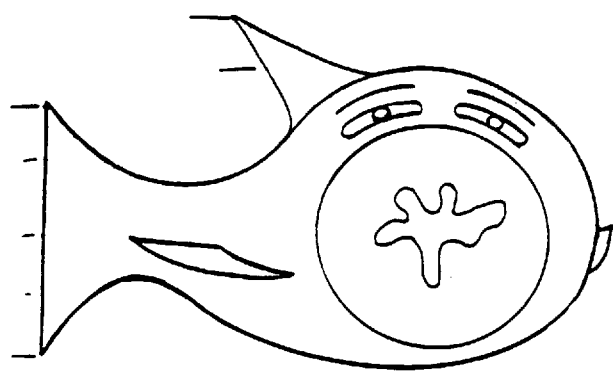
Figure 8E:
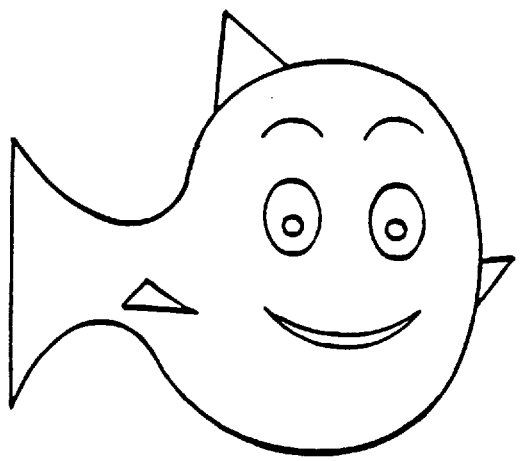
Figure 8F:
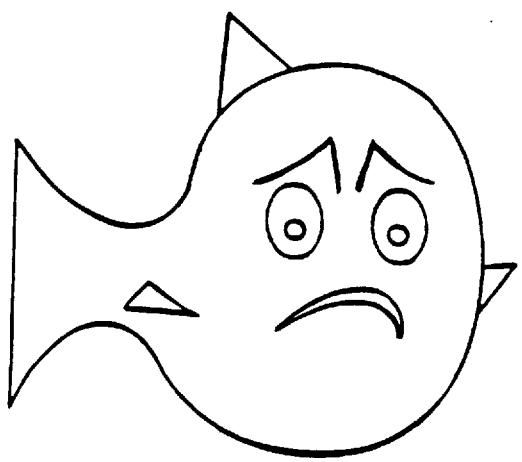
Figure 9A:
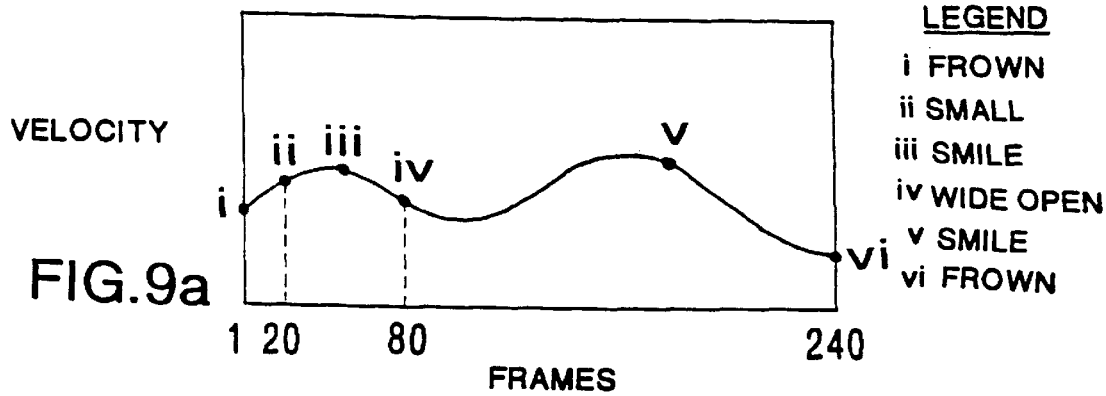
FIGS. 9(a)–(d) illustrate the velocity profiles for the transformation graphs of FIGS. 4, 5, 6, and 7.
Figure 9B:
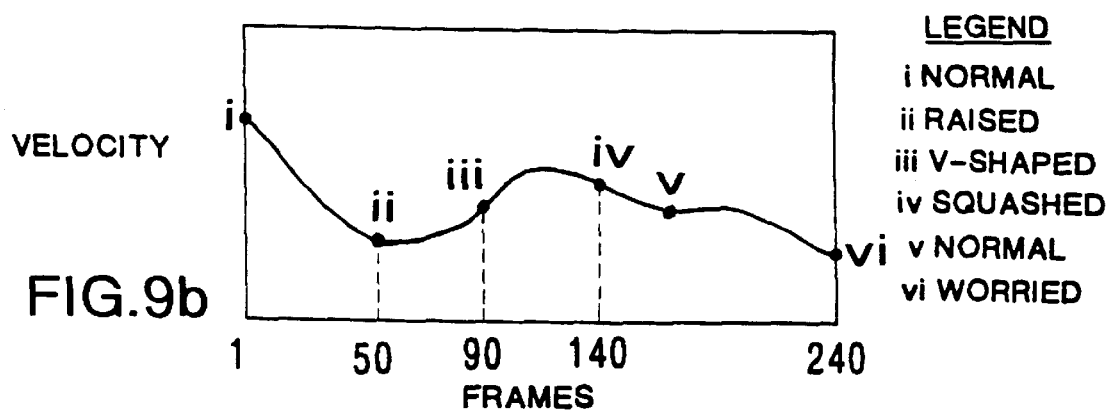
Figure 9C:
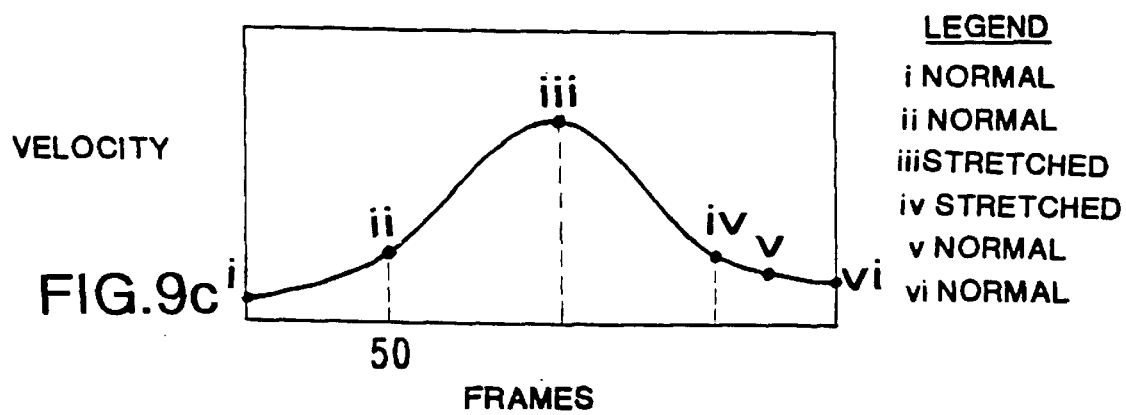
Figure 9D:
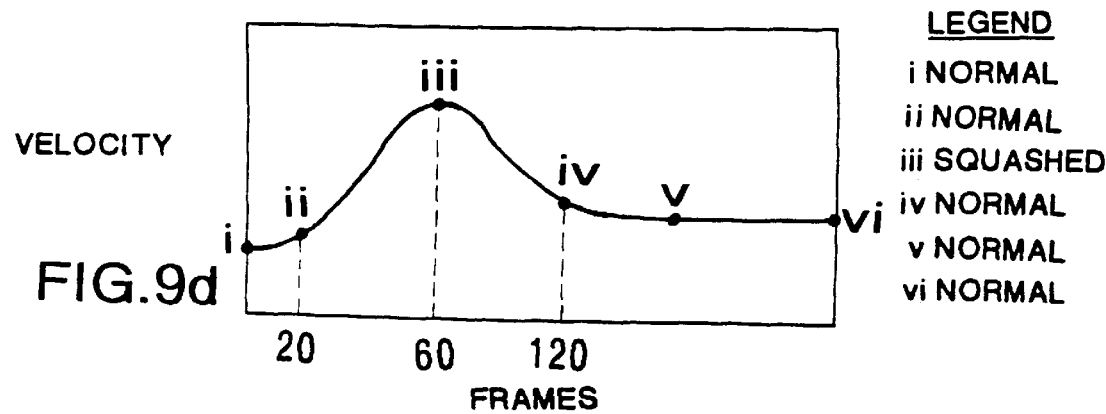

FIG. 4 illustrates a transformation graph drawn by the animator (using the wand) which controls the transformation of the shape of the mouth. Starting at point S (which is essentially a frown) lying approximately in the plane defined by vertices abc, the transformation graph progresses toward vertex c to point 1, then toward vertex b to point 2, then upward along the line bd to point 3, then downward on the plane abd to point 4, then along the line ab to the end point E. Although the transformation graph is shown essentially along the surfaces of the tetrahedron for purposes of illustrating it in a two-dimensional drawing, the graph may be drawn through any part of the volume enclosed by the tetrahedron. As the animator draws the path, the computer calculates, based on the sampled position of the wand in space, the location of the cursor from each vertex and then draws the resulting constructed pose. A subset of the points (every nth point) making up the constructed pose is selected for display so that the series of constructed poses can be seen in real time and the animator can view the motion he is scripting. This is done essentially in real time so that the animator can view the motion he is scripting as he moves the wand to control the cursor movement. FIG. 5 illustrates a three-dimensional transformation graph for another element of the fish drawing, the eye brows, FIG. 6 for the fish's body and fins taken together, and FIG. 7 for the eyes. In FIG. 6, there are only two source poses used at i and j. The other two vertices, k and l, are also assigned the pose assigned to vertex i as a programming convenience. The transformation graph could actually be scripted along a one-dimensional line as only two source poses are used. The same is true for FIG. 7, which illustrates the transformation graph for the eyes along the line m-n, although tetrahedron mnop is shown.

If a sequence using only three source poses is to be generated, a triangle on a plane may be used as the pose transformation space. Similarly, a sequence using only two poses can be scripted on a pose transformation space consisting simply of a line with one pose assigned to each end of the line. On the other hand, if more complicated motions are to be scripted using a greater number of source poses, the pose transformation space may be readily extended by utilizing the existing capability of the drawing wand to sense orientation. Each of the three components—pitch, roll, and yaw—may represent an additional source pose thus providing three additional source poses. This allows for a six dimensional pose transformation space in which any possible combination of seven source poses can be defined. Other inputs, such as foot-pedals, could provide for additional source poses. In such a case, the cursor in the pose transformation space would only reflect four poses; the degree of effect of the other inputs could only be seen in the resulting constructed pose.

In addition to controlling how the poses of animated objects change, the transformation graphs are also used to control the rate of transformation, which correlates to the apparent speed of the action produced in the animated object in the resulting animation sequence. Because the drawing system is sampling the position of the wand at a fixed rate, the position of the wand as a function of time is known. Therefore, the rate of movement of the wand is known and may be used to control the rate or speed of the scripted transformation.

When a transformation graph is drawn, the points of the graph are stored. These graph points are equally spaced in time. Therefore, the spacing of graph points in the pose transformation space depends on the speed with which the animator moves the drawing wand and their spacing controls the rate of change of the animated action. If the animator draws the graph in real time, each point may correspond to a frame of animation. Alternatively, the animator may first define the number of frames desired for the sequence and then draw the graph in "slow motion." In this case, the number of frames in the animation sequence will be less than the number of graph points generated. Similarly, the transformation graph may be drawn faster than real time so that the number of frames will be greater than the number of graph points. In these latter two cases, the transformation graphs are interpolated accordingly, to create the number of frames selected by the animator. The stored frames may then be played back at the rate at which they will be seen by the viewer (which is typically 24 or 30 frames per second) so that the animator can determine if the speed of the motion is appropriate. They can also be played back at faster and slower frame rates for analysis.

To facilitate adjustments to the speed of the action, the animator is provided with a graphical representation of the rate of transformation of the poses throughout the sequence of poses, referred to herein as a "velocity profile" for the transformation graph. The velocity profile shows the relative rate of change of the poses along the transformation graph. Without changing the sequence, the animator can adjust the velocities along the transformation graph using, e.g., a point, click, and drag action known in the art to modify the velocity profile, or by redrawing the velocity profile entirely. When the velocity profile is so changed, the spacing of the transformation points along the transformation graph is adjusted by interpolation in such a manner that the animation sequence still occurs over the correct number of frames. For example, if the relative speed of the action is increased in a portion of the transformation graph, it will be appropriately decreased in the remaining portion of the transformation graph.

FIGS. 8(*a*)–(*f*) illustrate the frames of animation resulting from the combined transformation graphs in FIGS. 4, 5, 6 and 7. In FIG. 8(*a*) (point S on the transformation graphs), the fish is approaching a piece of food which he notices in FIG. 8(*b*) (point 1). The sequence then continues until the fish swallows the food. FIGS. 8(*c*) through 8(*f*) correspond to points 2, 3, 4, and E in FIGS. 4, 5, 6 and 7. The points relate to different frames of animation, i.e., different points in time during a transformation sequence. For example, as shown in FIGS. 8(*a*)–(*f*), times 0, 1, 2, 3, 4, and E may correspond to frames 1, 40, 90, 150, 180 and 240, respectively.

FIG. 9(*a*)–(*d*) show the velocity profiles of the transformation graphs for the mouth, eyebrows, body, and eyes, respectively, which are illustrated in FIGS. 4–7, as they might be after recording the respective transformation graphs. The x-axis indicates time or number of frames and the y-axis the instantaneous rate of transformation of the constructed poses. A zero rate of transformation means that the image is static; a flat, non-zero rate that the image is transforming at a constant rate, a positive slope means that the rate is increasing and a negative slope that the rate is decreasing. For each velocity profile in FIGS. 9(*a*)–(*d*), six points are shown, i–vi, each corresponding to a frame in an animation sequence. For each of these points, the legend adjacent to each of the graphs indicates the pose associated with the frame. The velocity profiles of FIGS. 9(*a*)–(*d*) may be displayed after an animator has generated the respective transformation graphs to indicate the rate of transformation as drawn by the animator. Note that as shown, the points i–vi do not correspond to the same frame in each of the four velocity profiles. The animator may manually modify the profile by "nudging" (using the wand cursor to push parts of the graph into a different shape) a portion of the graph or by redrawing the entire graph to adjust the transformation rate as desired.

If all the transformations in a drawing are controlled by the same transformation graph, the effect may be mechanical and not life-like. By dividing a drawing into groups and drawing a separate unique transformation graph for each, a complex life-like action can be created. However, when a composite drawing is generated from different groups of elements controlled with different transformation graphs, there may be a need to coordinate the action of the different groups before they are compiled into frames of animation. For example, as originally drawn, the velocity profiles for the mouth, eyebrow, body, and eye transformations are as shown in FIGS. 9(a)–(d). It may be seen in FIGS. 9(a)–(d) that these velocity profiles produce constructed poses of the mouth, eyebrows, body, and eyes that are not synchronized in time compared to the desired relationships of the different body parts as shown in FIGS. 8(a)–(d). The differences are exaggerated for clarity. For example, at the point where the mouth of the fish is large, the eyes and eye brows must be portrayed as squashed toward the top of the head of the fish. As originally produced (as shown in the unmodified velocity profiles of the transformation graphs), the mouth is large at point iv in FIG. 9(a), approximately frame 80, while the eyes and eyebrows are squashed at frames 60 and 140, respectively. The present invention facilitates the synchronization of the actions of different groups of elements as follows. While drawing the transformation graph for, e.g., the eyes, the animator may simultaneously view the played-back action of the mouth, which was scripted using a transformation graph and stored. In this manner, the animator may manually synchronize the actions of the elements. Repeated "takes" may be used until the animator is satisfied with the synchronization. The playback may be in real time or, if desired, in slow motion to facilitate synchronization.

Alternatively, this may be done using the concept of synchronization points or "sync" points. Sync points are used to specify that at a particular point in time during a sequence (i.e., a particular frame of animation within a sequence of frames), a group of elements will have a selected form, such as the open mouth of the fish. In a preferred embodiment, a frame identifier is first assigned to the designated frame (point in time) where the sync point will occur. Next, the constructed pose to be assigned to the selected frame is chosen by using a pointing device (such as the drawing wand) to scroll along a linear scroll bar representative of the entirety of the transformation graph. As the animator moves the cursor along the scroll bar, the constructed pose corresponding to that point on the transformation graph is displayed. In addition, the position of the cursor on the actual transformation path is displayed as well. When the desired constructed pose is displayed, a wand button is clicked to indicate that that pose is to be synchronized with the selected frame.

In a second group of elements to be coordinated with the first group, the corresponding constructed pose (i.e., squashed eyes) is chosen by the animator in the same manner. This pose is assigned the same frame identifier as the frame in the transformation graph for the mouth so that it too is synchronized with the selected frame. In this manner, the selected mouth pose and the corresponding eye pose will occur in the same frame and therefore the same point in time. The sequence of poses along the transformation path is not affected. However, in order to force a selected pose to occur at a particular time, the velocity of the transformation must be adjusted. This is done by reducing or expanding the number of frames between each sync point, as required. This is done by interpolation, so that in so far as possible the original velocity profile is maintained. However, depending on the velocity profiles, it may be difficult to maintain the shape of the velocity profile in the vicinity of one or more sync points without creating a discontinuity in the motion. In this case, the resulting animation sequence may be played back to determine if there is a discontinuity noticeable to a viewer. In general, sudden changes in the velocity of a transformation are not detectable by the viewer. However, if it is, the shape of the velocity profile may be adjusted or re-drawn by the animator to eliminate the discontinuity. It is likely that there will be multiple sync points used along a transformation graph. The same procedure is followed for each such point.

Figure 10A:
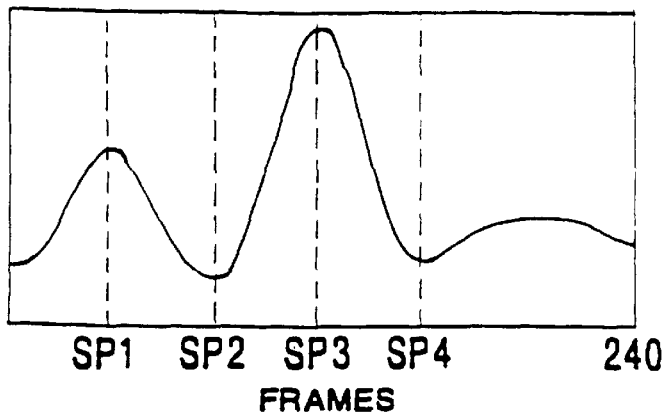
FIGS. 10(a)–(d) illustrate the velocity profiles for the transformation graphs of FIGS. 4, 5, 6, and 7 adjusted by the use of sync points.
Figure 10B:
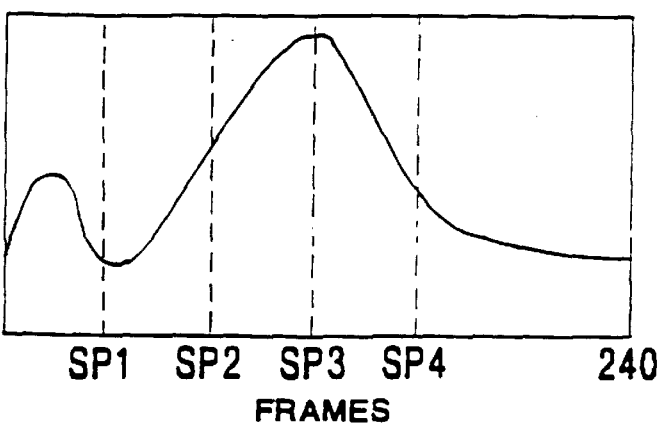
Figure 10C:
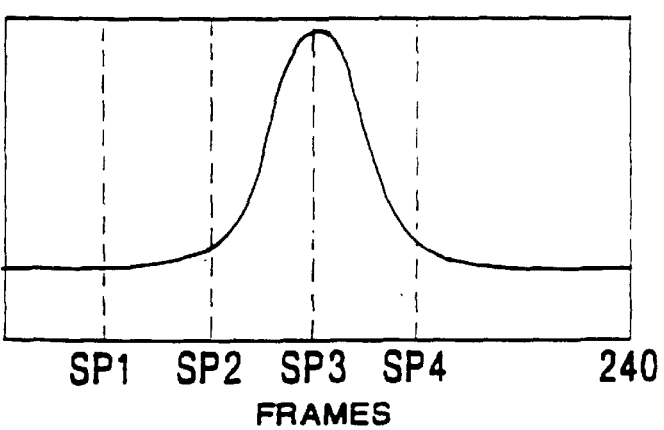
Figure 10D:
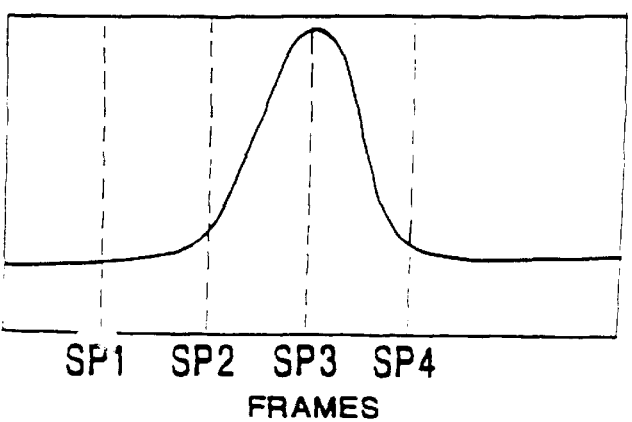

FIGS. 10(a)–(d) illustrate the sync point concept. The sync points are labelled SP1–SP4. These might, for example, correspond to frames 40, 90, 150, and 180 as shown in FIGS. 8(a)–(f). FIG. 10(a) is the velocity profile for the transformation graph for the mouth of the fish and FIGS. 10(b)–(d) the eyebrows, body, and eyes, respectively. As in FIGS. 9(a)–(d), the velocity profiles in FIGS. 10(a)–(d) correspond to the transformation graphs of FIGS. 4–7, respectively, but in this case have been re-generated using sync points. In the animation sequence, the large (wide open) mouth must occur when the eyes of the fish are squashed towards the top of its head and the small mouth when the eyes are wide open. Therefore, point SP1 along the transformation graph is assigned to the point in time when the mouth is small and point SP3 when the mouth is large. The velocities along the transformation graph are then adjusted (by interpolation) so that point ii in FIG. 9(a) (small mouth) has been shifted later by 20 frames, and point iv (large mouth) has been shifted later by 70 frames, to occur at frames 40 and 150, respectively. Similarly, point SP2 (frame 90) is assigned to the point in time when the first smile occurs and SP4 (frame 180) when the second smile occurs (points iii and v in FIG. 9(a), respectively). All the other elements are similarly adjusted, so that proper synchronization occurs, as shown in FIGS. 10(a)–(d), and the desired relationships of the different features as shown in FIGS. 8(a)–(f) are obtained. Sync points may also be used to properly synchronize the action within a constructed pose transformation sequence to a sound track.

Figure 11A:
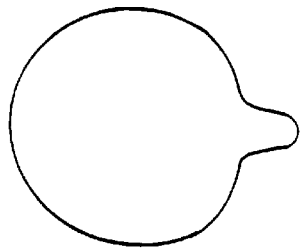
FIGS. 11(a)–(f) illustrate the advantage of using match points in constructed poses.
Figure 11D:
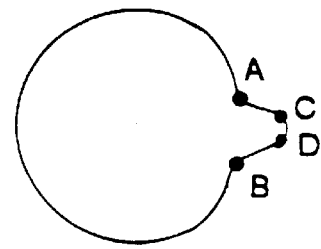
Figure 11B:
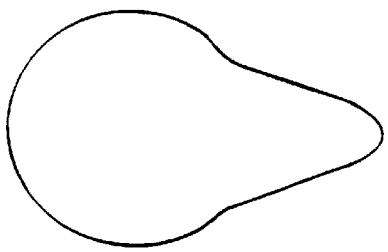
Figure 11E:
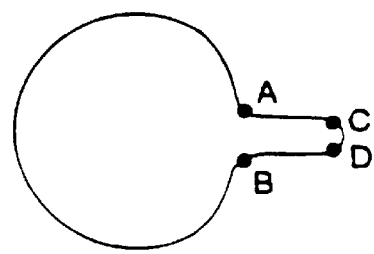
Figure 11C:
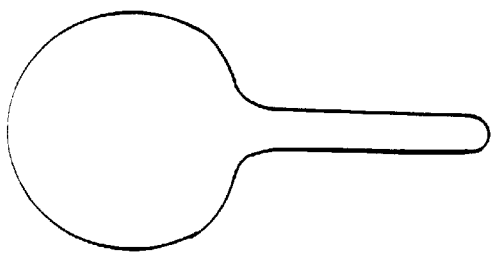
Figure 11F:
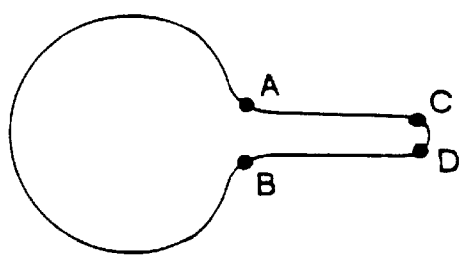

Segments of the source poses may be mapped onto one another using match points to avoid undesirable constructed poses. The use of match points is known to those of ordinary skill in the art and is briefly described as illustrated in FIG. 11. Match points break up lines into segments so that the weighted averaging discussed above to calculate point locations occurs along corresponding segments in each pose. FIGS. 11(a)–(c) represent a profile view of a character's head with a growing nose. Of course, the intention is that the head maintain the same shape as the nose grows. However, if the source poses shown in FIG. 11(a) and 11(c) are used to generate the constructed pose in FIG. 11(b), the image is distorted. In order to prevent such distortion, match points A and B are assigned as shown in FIGS. 11(d)–(f) so that the proper shape of the head is maintained in the constructed pose FIG. 11(e). The match points cause the weighted averaging to take place along two related segments of the source poses. Therefore, because the head portion has the same form in the two source poses in FIGS. 11(d) and 11(f), the head is also the same form in the constructed pose. Match points C and D shown in FIGS. 11(d)–(f) cause the nose to maintain its shape as it elongates and shrinks. Without these points, the nose could appear somewhat pointy as in FIG. 11(e) at some point in the transformation.

Table 1 is one embodiment of the pseudo-code for calculating a constructed pose from the four source poses of a tetrahedron. Table 2 is one embodiment of the pseudo-code for creating an animated sequence from the source poses and a transformation graph.

TABLE 1

```
Const MaxLineLength = 1000;
{ ********* Definition of a Point ********** }
Type PointType =
      Record
        X, Y, Z : single;
      End;
{ ********* Definition of a Line ********** }
Type LineType =
      Record
        NoOfPoints : Integer;
        Point    Array [1..MaxLineLength] of PointType;
      End;
{******************************************************************}
{                                                                  }
{The following routine calculates a constructed pose from four source poses.}
{                                                                  }
{It has two different uses : 1) for visual realtime feedback when the animator}
{is creating the transformation graph and 2) as a subroutine when playing back}
{the recorded animation sequence for animator review.             }
{This simple example works for drawings made up of a single line; it would be }
{put in a larger loop for a multi-line drawing.                    }
{The four source poses must previously have been "aligned" (ie. they each must}
{contain the same number of points and point N in pose A must correspond to}
{point N in poses B, C and D. This is done using "Match Points."}
{******************************************************************}
Procedure CalculatePose
          (Var PoseA, PoseB,
               PoseC, PoseD : LineType;    {The four source poses }
           Var CalcPos : PointType;        {Pos. in tetrahedron to calc, for}
           Var DestPose : LineType);       {Resulting pose }
{Local function to get distance from the point to a vertex of the tetrahedr.}
Function DistToVertex (Var P1, P2 : PointType) : Single;
Begin
  DistToVertex := Sqrt ((P1.X - P2.X)'+ (P1.Y - P2.Y)'+ (P1.Z - P2.Z)');
End;
Var DistA, DistB, DistC, DistD, TotalDist : Single;
    ProportionA, ProportionB, ProportionC, ProportionD, PropScaling : Single;
Begin
  {*************** Get Distance to each Vertex }
DistA := DistToVertex (Calcpos, VertexA); {Assumes vertices defined elsewhere}
DistB := DistToVertex (Calcpos, VertexB);
DistC := DistToVertex (Calcpos, VertexC);
DistD := DistToVertex (Calcpos, VertexD);
{*************** Use them to calc. contributing proportion of each source pose}
TotalDist := DistA + DistB + DistC + DistD;
ProportionA := TotalDist / DistA;
ProportionB := TotalDist / DistB;
ProportionC := TotalDist / DistC;
ProportionD := TotalDist / DistD;
{*************** Scale the proportions to total one }
PropScaling := ProportionA + ProportionB + ProportionC + ProportionD;
ProportionA := ProportionA / Propscaling;
ProportionB := ProportionB / PropScaling;
ProportionC := ProportionC / PropScaling;
ProportionD := ProportionD / PropScaling;
{*************** Calculate the new pose }
DestPose.NoOfpoints := PoseA.NoOfPoints;
For I := 1 to PoseA.NoOfpoints do
  Begin
Destpose.Point[I] .X :=   ProportionA * PoseA.Point[I].X +
                          ProportionB * PoseB.Point[I].X +
                          ProportionC * PoseC.Point[I].X +
                          ProportionD * PoseD.Point[I].X;
DestPose.Point[I] .Y :=   ProportionA * PoseA.Point[I].Y +
                          ProportionB * PoseB.Point[I].Y +
                          ProportionC * PoseC.Point[I].Y +
                          ProportionD * PoseD.Point[I].Y;
DestPose.Point[I] .Z     ProportionA * PoseA.Point[I].Z +
                          ProportionB * PoseB.Point[I].Z +
                          Proportionc * Posec.Point[I].Z +
                          ProportionD * PoseD.Point[I].Z;
End;
```

TABLE 2

```
{********* Definition of a Line *************** }
Type LineType =
     Record
       NoOfPoints : Integer;
       Point     : Array [1..MaxLineLength] of PointType;
     End;
{ ********* Definition of an Animated Sequence ********** }
Type AnimatedSeqType =
     Array [1..NoOfFrames] of LineType;
{***********************************************************}
{This routine computes the frames of composed animation from four source }
{poses and a transformation graph.                                       }
{***********************************************************}
Procedure CreateSequence
            (Var PoseA, PoseB,
                 PoseC, PoseD : LineType;        {The four source poses }
                 Var TransGraph : LineType;      {Trans. Graph is just a line)
                 NoOfFrames : Integer;           {Number of frames to create}
             Var Destsequence : AnimatedSeqType);  {Resulting sequence }
Var FramePoints : LineType;
Begin
 {**************Convert T-Graph to an array of Frame Points based on timing }
 FramePointsFromTransGraphTiming (TranformationGraph, NoOfFrames, FramePoints);
 {************* Allow user to adjust the timing manually }
 While not CheckIfUserHappy (Framepoints)
   LetUserFixCurve (Framepoints);
 {************* Calculate each frame }
 For I := 1 to NoOfFrames do
   CalculatePose (PoseA, PoseB, PoseC, PoseD, FramePoints[I], DestSequence[I]);
End;
{***********************************************************}
{Sub-routine to convert a transformation graph to an array of Frame Points. }
{Each frame point is a point on the same 3-space line as the Transformation }
{Graph, distributed along the line so that the action timing appears natural.}
{***********************************************************}
Procedure TransGraphToFrarnepoints
            (Var TransGraph : LineType;   {Transforrnation Graph }
                 NoOfFrarnes : Inteqer;   {Number of frames needed }
             Var Framepoints : LineType); {Frame points created }
Var Units : Integer;
    Fraction, PointTouse : Single;
Begin
 FramePoints.NoOfpoints := NoOfFrames;
 {*************** First and Last Points are fixed }
 Framepoints.Point [1]           := TransGraph.Point[1];
 Framepoints.Point [NoOfFrames]    : = TransGraph.Point [TransGraph.NoOfPoints];
 {************** Start by using the timing from when Trans.Graph was drawn }
 For I := 2 to NoOfFrarnes - 1 do
  Begin
   { Find a point partway along some line segment in the Trans. Graph}
   PointToUse := (I-1)/(TransGraph.NoOfPoints-1);  { A real number }
   Units    := Trunc (PointToUse);
   Fraction := PointToUse - Units;
   Framepoints.Point[I].X := TransGraph.Point[Units].X +
    Fraction * (TransGraph.Point [Units+1].X - TransGraph.Point [Units].X);
   FramePoints.Point[I].Y := TransGraph.Point[Units].Y +
    Fraction * (TransGraph.Point[Units+1].Y - TransGraph.Point[Units].Y);
   FramePoints.Point[I].Z := TransGraph.Point(Units].Z +
    Fraction * (TransGraph.Point[Units+1].Z - TransGraph.Point[Units].Z);
  End;
End;
```

The system and method of the present invention also provides for the tying together of different, separately transformed groups of line segments by specifying an attach point on one group of elements to which another group is connected. This feature is useful in the case where different groups of elements experience different motions, but one group is in reality attached to the other, such as in the case of the head and body of a person. This feature is implemented by specifying a first group of elements as the master and a second group as the slave. In the above example, the master would be the body and the head the slave. Techniques for relating the locations of animated groups in this manner are known to those of skill in the art in the field of computer animation.

If an animation sequence requires a very complex set of actions to be scripted —more than can be constructed from a convenient number of poses—a transformation graph through two or more pose transformation spaces may pass through a common vertex of the tetrahedra to generate a continuous motion sequence. In this manner, for example, an action is scripted inside a first tetrahedron and then through a vertex which is common between a first tetrahedron and a second tetrahedron (which have a common source pose at that vertex). The animator then continues the transformation graph in the second tetrahedron which has three different source poses associated with its other vertices. Similarly, the second tetrahedron may connect with a third tetrahedron and so forth. Linking of pose transformation spaces in this manner enables complex series of actions to be defined by one continuous "script. " In addition to linking pose transformation spaces at a common vertex, the endpoint constructed pose of a motion sequence, which need not be a source pose, may be used as one of the source poses in the transformation space for a second motion sequence. The transformation graph for the second motion sequence is started at the vertex associated with that source pose, so that the action is continuous and seamless when the two sequences are joined together.

The transformation graphs may be stored and are not uniquely associated with specific source poses—the same transformation graph representing, e.g., a walking action, may be applied to control the animation sequence for different sets of source poses representing different characters. Similarly, source poses can be stored for use with different transformation graphs.

The animation sequences generated by the transformation graphs may themselves be represented in a tetrahedral transformation space in order to generate a single output animation sequence. For example, four different perspective views (e.g., 90° apart) of a walking action may be created by generating four sets of constructed poses. The four sets of constructed poses may be generated by drawing a transformation graph for one of the perspective views, using four source poses for that perspective view, and then using the same transformation graph for each of the other three pose transformation spaces associated with the other three perspective views. In this manner, synchronization of the four sets of constructed poses is automatic.

Each set of constructed poses is then assigned to one vertex of a tetrahedron, which in this case may be considered a perspective transformation space rather than a pose transformation space. Rather than each vertex representing a single, fixed source pose, the source pose at each vertex varies as a function of time, i.e., it is determined by the constructed pose for that vertex at any given point in time. A transformation graph is then drawn within this tetrahedron to specify the contribution each constructed pose makes at each point in time during the transformation, to the final single constructed pose at that point. At each point along the transformation graph, the final constructed pose is determined by a composite of the four source poses, except that each source pose actually represents a different perspective of the same pose. Therefore, the movement of the wand only changes the perspective of the action, not the transformation of the object itself, which has already been defined by the sets of constructed poses. In this manner, a transformation graph can be generated representing a continuous walking action with a continuous change of the viewer's perspective on that action to simulate, for example, a camera panning around an object.

The aforedescribed transformation graph technique for scripting motions is a significant improvement over existing computer animation systems. Simply by manipulating a wand in a three-dimensional drawing space, an animator can create long and complex motions using a user interface that allows such motions to be generated in an intuitive manner as a "performance," somewhat as a puppeteer would control the actions of a puppet, and to view the motion in real time. The advantage of this technique is most significant in three-dimensional computer-assisted animation, where creating even a single pose, much less an entire sequence, using existing techniques is complicated and time consuming. For two-dimensional animation, the technique may be used to produce long sequences of two-dimensional animation with little effort.

In typical computer animation systems, both the position in space and the transformation of an object are represented simultaneously in a pose. The system and method of the present invention provides the flexibility to separate the transformation of an object from its path in space. In this case, the wand may be used to generate a path in space (referred to as a "space path") for a character or object separately from defining a pose transformation graph. The path in space has an associated velocity graph, which may be modified as described above by adjusting or redrawing it, or through the use of sync points.

A second aspect of the present invention is referred to as "segment warping" and is also directed to further modifying constructed poses to provide for greater control over the form and action of animated images. Segment warps are described as follows. A point within the drawing space, referred to herein as a warp displacement reference point or "warp handle, " is chosen, which will typically be on a line segment of a source pose, but need not be so located. The function of the warp handle is to serve as a reference point for a motion path relative to this point, referred to herein as a "warp path." The warp path is drawn by the animator in real time or in slow or fast motion. The warp path defines, for each segment or segments to be modified by the segment warp, the relative displacement of the warp handle from its starting point. The line segment or segments of a drawing to be modified by the warp path are then specified by any one of a number of methods, such as pointing and clicking with the drawing wand. In addition, a graph, referred to herein as a "warp profile graph," is drawn which defines the degree to which the successive points on the line segment or segments are displaced by the warp path.

Figure 12B:
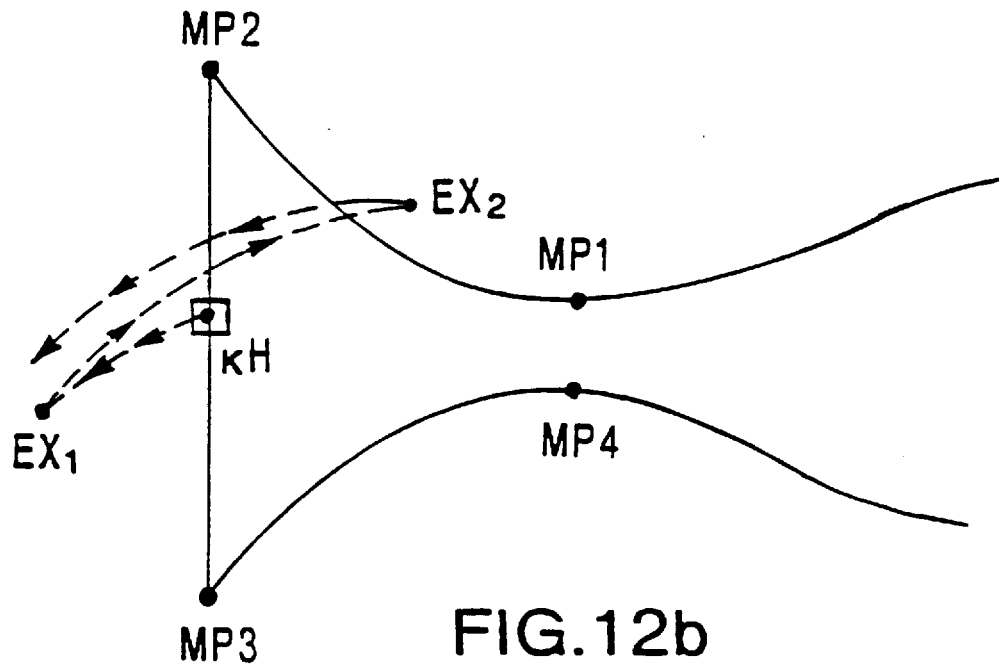

The segment warp technique is best described with reference to a specific example. In the fish shown in FIG. 12(a), match points are placed on the fish body and tail at points labelled MP1, MP2, MP3, and MP4. A warp handle, H, is then placed on the segment between MP2 and MP3. The three segments, MP1–MP2, MP2–MP3, and MP3–MP4, are then identified as the segments to be warped. FIG. 12(b) illustrates the warp path, shown as the dotted line with arrows indicating direction. In this example, the warp path represents the back and forth motion of a fish's tail and is represented by a series of arcs. The warp path is not part of the drawing itself and is not shown in the final animation. The path is shown moving toward the first extreme EX1, then toward an opposite extreme, EX2, then back toward the first extreme EX1 again. A warp profile graph is then drawn for the three segments as shown in FIG. 13. The warp profile graph defines the relative effect of the warp path of FIG. 12(b) on each successive point along the selected line segments. As shown in FIG. 13, the effect of the warp on segment MP1–MP2 is zero at MP1 and increases to 90% at MP2, stays constant at 90% for segment MP2–MP3, and varies from 90% at MP3 to 0% at MP4 for segment MP3–MP4. This means that, for example, at any point in time, the displacement of the points along segment MP2–MP3 will be 90% of the relative displacement of the warp handle from its initial position at that point in time. In other words, if at a particular point during the warp the relative displacement of the handle from its initial position is 1.0 units of length in a z direction (into the paper), 0.4 units in an x direction (horizontal), and 0.1 units in a y direction (vertical), the displacement of all the points along the segment MP2–MP3 from their initial positions will be 0.9, 0.36, and 0.09, respectively. The points along the segment MP1–MP2 will not be displaced at all at MP1, will be displaced progressively more towards MP2, until at MP2 the displacement is 0.9. The effect along MP3–MP4 will be reversed.

Because segment warps simply represent point displacements for the points along selected line segments, they are additive—multiple segment warps may be applied to the same segment or segments.

Figure 14:
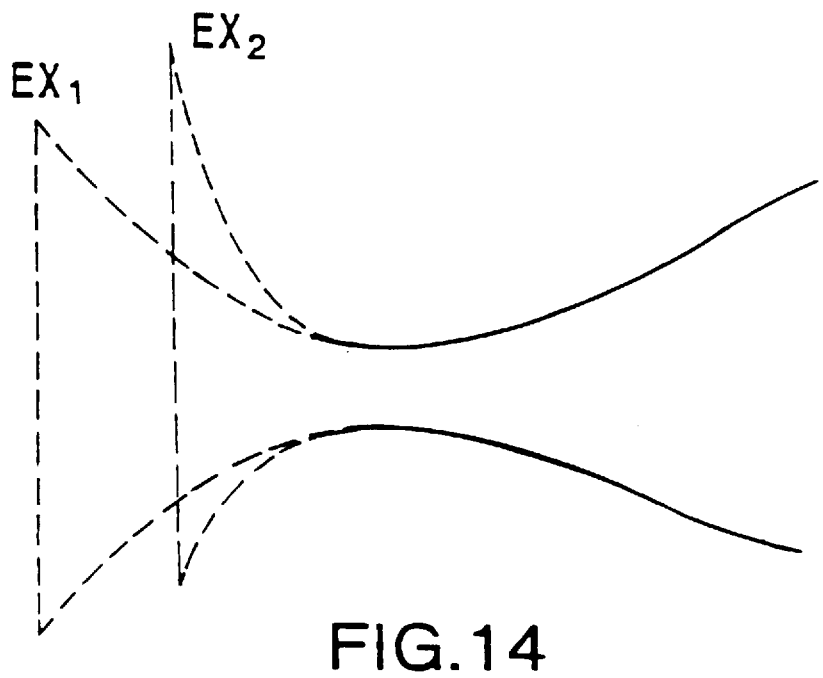
FIG. 14 illustrates the resulting motion created by the segment warp defined by FIGS. 12–13.

The effect of the segment warp on the three segments is shown in FIG. 14. At point Ex1, the tail is at its maximum displacement along the arc defined by the warp path. The end of the tail, segment MP2–MP3, is displaced to its maximum extent out of the paper (toward the observer). Similarly, at point Ex2, segment MP2–MP3 is displaced to its maximum extent into the paper (away from the viewer.

Rather than defining a warp profile graph as shown in FIG. 13, the animator may specify the relative displacement of the points along the line segment in any of a number of ways, such as by varying the thickness, brightness, or color of the selected segment.

It will be recognized by those of skill in the art that the segment warp technique provides a powerful and intuitive tool for animators to create complex motions very simply. By specifying the warp handle on the vertical segment of the tail MP1–MP2 as shown in FIG. 12(a), the animator can, in effect, "grab on" to the tail with a drawing wand and move it back and forth in real time, exactly as it is intended that the final motion should appear. Thus, subtle differences in the timing, direction, and extent of animated motions can be quickly and simply produced. The rate and coordination of the motion with other motions of the object (i.e., transformations), may be controlled using the previously described velocity profiles and sync points.

Figure 15:
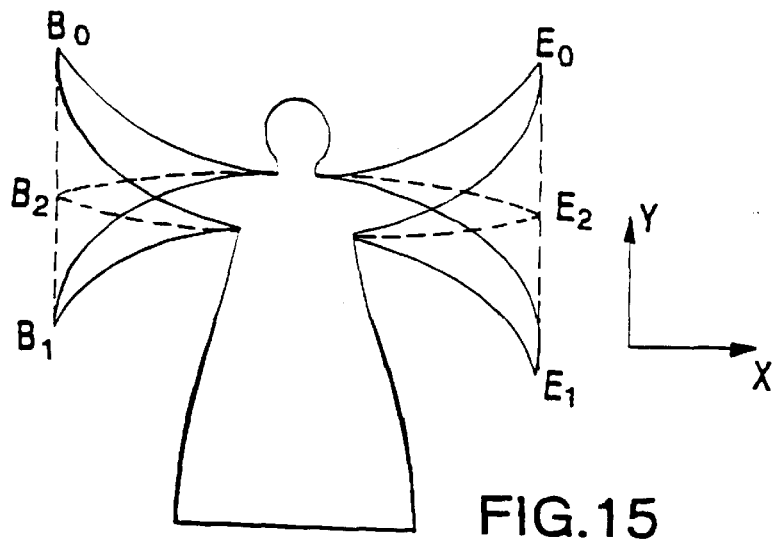
FIG. 15 illustrates an angel wing as an example of the problems with prior art in-betweening systems.

A further example of the utility of the segment warping concept may be explained with reference to another application. In prior art computer animation systems, in-between frames are frequently generated by the computer by linearly interpolating between line segments in the drawings of the two source poses. However, interpolation can sometimes result in unrealistic motions. One situation where this occurs is where the motion between source poses is rotational and constructed poses are generated using linear interpolation. FIG. 15 illustrates the potential deficiencies of using simple interpolation to create new poses. The motion of an "angel wing" is illustrated in FIG. 15 showing the movement of an angel's beating wings. Point E is at the tip of the right wing and point B at the tip of the left wing. At $E_0$ and $B_0$, the wings are at the top of their arc (at pose 1) and at $B_1$ and $E_1$, the bottom of their arc (at pose 2). The midpoints of rotation of the wings are at $B_2$ and $E_2$ respectively. In true rotational motion, the wing tips are at minimum x displacement at the top and bottom of the arc and at maximum x displacement at the midpoint. If the animator specifies only the top and bottom wing positions as shown in FIG. 15 as source poses, and the computer generates the constructed poses through linear interpolation, the result is that the wing will appear to shrink as it moves from top to bottom, as shown by the positions of the tips at $B_2$ and $E_2$ (dotted lines). Of course, additional source poses may be specified by the animator at intermediate positions between the extremes of motion of the wing, but the additional poses may be needed for creating other wing motions, for example, a twisting of the wings as they beat up and down.

Figure 16A:
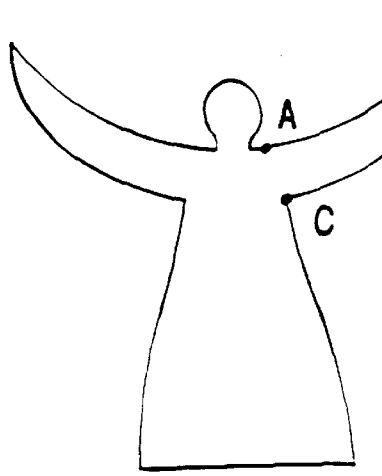
FIGS. 16(a)–(c) illustrate how the problem of FIG. 15 is corrected using the segment warp technique of the present invention.
Figure 16C:
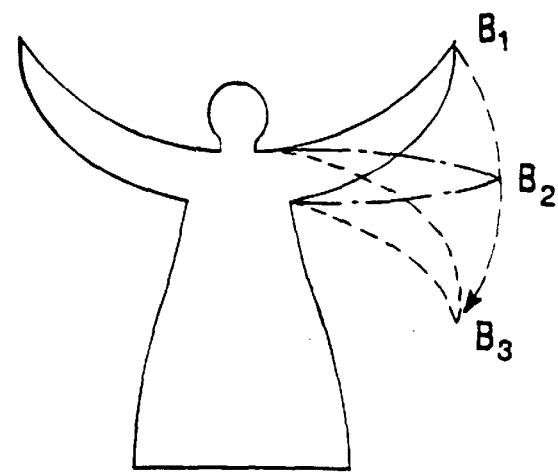
Figure 16B:
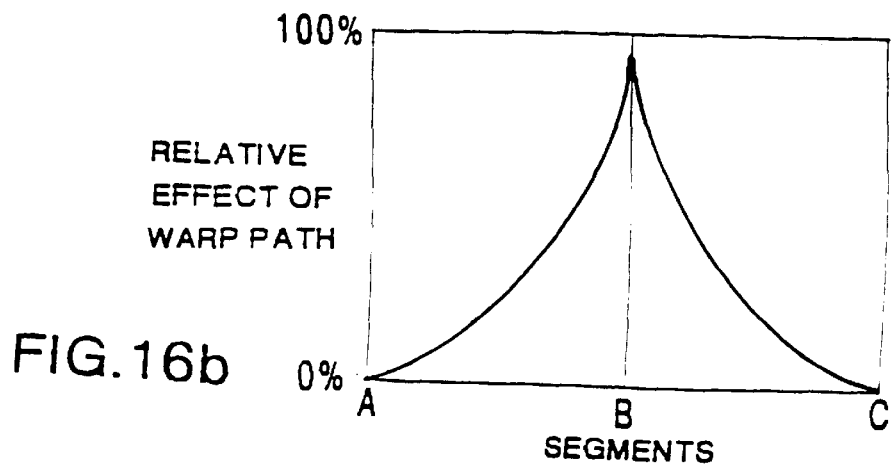

The segment warp technique of the present invention solves this problem as described with reference to FIG. 16. As shown in FIG. 16(a), using the right wing as an example, match points are specified at points A, B, and C. A warp handle, WH, is then specified at point B, the wing tip. A warp path, WP, shown as the dotted line, is drawn to specify the relative displacement of the warp handle. The warp path shown is for one downward sweep of the wing from the top of its arc to the bottom. The warp profile is drawn as in FIG. 16(b). The segment warp specified by the warp path and profile graph is then applied in conjunction with the pose transformations of the angel wings, which are specified with a pose transformation graph, as described above. As the wing moves downward, the displacements specified by the warp path are applied to the points along the segments A–B and A–C in accordance with the warp profile shown in FIG. 16(b).

The result is that as the wing moves downward from pose 1 to pose 2 to pose 3, the points along the two segments are displaced so as to maintain the proper size of the wing during the transformation from pose to pose. The wing in effect is progressively stretched outward as it moves down so that the wing tip follows the proper arc, designated B1, B2, B3 in FIG. 16(c). The action of the angel with the wings moving up and down may be scripted using the previously described transformation graph and velocity profile. This action may then be coordinated to the segment warp of the wing. As previously described, this may be done by drawing the warp path while viewing the transformation of the angel's wings or using sync points to control the velocity profiles so that, for example, the maximum displacement of the warp from the reference point occurs when the wing is at the midpoint of the sweep downward of the wing.

If there are many beats of the wing, as would normally be the case, a single warp path (basically an outward and inward motion) is drawn, continuously, for each down beat and each up beat, and the warps are synchronized to the beats as described above. A similar segment warp would be applied to the left wing as well.

The segment warp concept is a very powerful technique with many applications. For example, complex effects such as waves, wind effects, and acceleration effects may be readily achieved using this technique. Wind effects may be created as illustrated in FIG. 17. FIG. 17(a) illustrates a flag which the animator wants to illustrate as blowing in the wind. Three segments of the flag are to be transformed by the segment warp, labelled S1, S2, and S3 as shown. Match points MP1 and MP2 are also shown at the lower corners of the flag. S1 is comprised of points 0–MP1, S2 of points MP1–MP2, and S3 of points MP2–3. A warp handle H is placed at point MP2 for convenience and potential warp path P, represented by the dotted line in FIG. 17(a), is drawn. FIG. 17(b) represents the profile graph for the three line segments. As shown in FIG. 17(b), segment S1 varies from zero displacement at the attach point 0 to maximum displacement at MP1. Segment S2 is always at maximum displacement, and segment S3, like segment S1, varies from zero displacement at point 3 to maximum displacement.

Thus far, a normal segment warp has been described. However, for wind effects, the warp path P represents only the potential warp path of the segments. The actual position along the path is determined by specifying a wind vector as shown in FIG. 17(c). This is simply drawn by the animator as if the wand were being blown back and forth by the wind, and recorded by the computer. For purposes of simplifying the description, the wind is shown blowing along the x-axis only. FIG. 17(d) represents the velocity profile for the wind which could be derived from tracking the rate of the back and forth motion of the drawing wand when generating the wind path shown in FIG. 17(c). At maximum positive velocity the maximum positive displacement along the potential warp path is applied and at maximum negative velocity, the maximum negative displacement is applied. In addition, zero displacement is defined to occur at zero velocity. Displacements between zero and the maximum point and zero and the minimum point are produced simply by using the wind velocity at each frame interpolated so that the maximum wind velocity corresponds to maximum displacement. Depending on the direction (positive or negative) and speed of the wind, the segments will be warped as shown in FIG. 17(e) (negative) or 17(f) (positive). The displacement of a particular point of a line segment along the motion path at any given point in time is dictated by the velocity of the wind at that point in time, which could be positive or negative and thus also defines the direction of displacement. The potential warp path must be drawn with reference to the wind direction. Thus, if the wind direction were not along only the x axis as shown in FIG. 17(a), but also along the z axis, a potential warp path would have to be drawn for how segments of the flag would be warped in the z axis. The wind velocity along the z axis would also be determined from the wind vector.

The advantage of this technique over a normal segment warp is that it provides for control of the displacement along a potential warp path as opposed to an actual predetermined warp path. In addition, use of the wind warp permits the same wind vector to be applied to numerous elements in a drawing which will all be similarly affected by the wind. The animator may specify that the wind warp be applied to different objects in a drawing at different times to create the effect of a gust of wind moving through a scene.

Inertial effects are created in a manner similar to wind effects. In this case, however, rather than using the wind velocity to control the displacement along a potential warp path, the acceleration of a main object of motion is used. For example, if a character begins to run, his acceleration will cause his coat to lift up behind him in the opposite direction. A potential warp path for the coat may be drawn, and the position of the appropriate segments of the coat along the potential warp path determined by the change in velocity (acceleration) of the person wearing the coat. Thus, when the character begins to move from a standing position, acceleration is greatest and the coat will fan out behind him to the maximum extent. As the character reaches a steady velocity, however, his acceleration goes to zero and the coat returns to the zero displacement position.

Figure 18A:
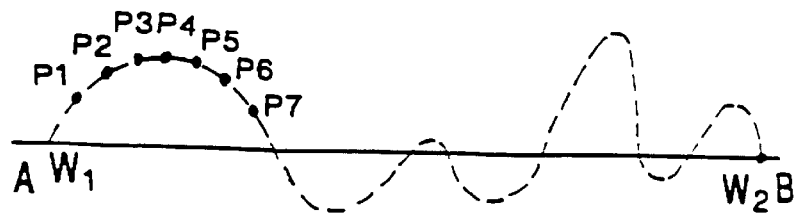
FIGS. 18(a)–(e) illustrate the wave effect that can be achieved using a further variation of the segment warp of the present invention.

Wave effects may also be created using the segment warp concept. A "wave warp" is a means for creating the effect of a wave travelling through a segment or segments. In the case of a wave effect, a warp handle and warp path are not required. A straight reference line A–B as shown in FIG. 18(a) is drawn. The desired wave motion, shown as dotted line w1–w2, is drawn with reference to this line. The wave W1–W2 need not lie in one plane but may be three-dimensional so as to define, for example, a corkscrew.

Figure 18B:
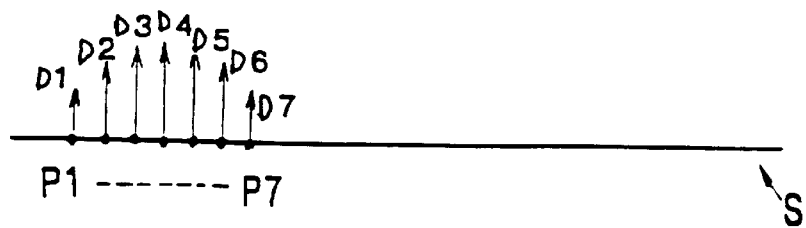

The displacements between each point along the wave relative to the line A-B is calculated based on vectors drawn normal to the straight line and intersecting the wave. For each point Pi along the wave, the corresponding displacement Di is calculated. As shown in FIG. 18(b), these relative displacements are then applied to a line segment S of a drawing in order to transfer the effect of the wave to the object or objects in the drawing (only P1–P7, representing the first crest of the wave, are illustrated).

Figure 18C:
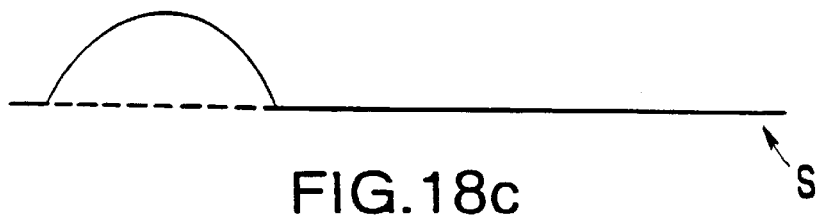
Figure 18D:
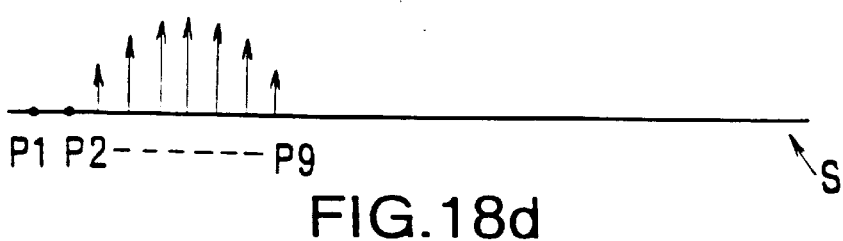
Figure 18E:
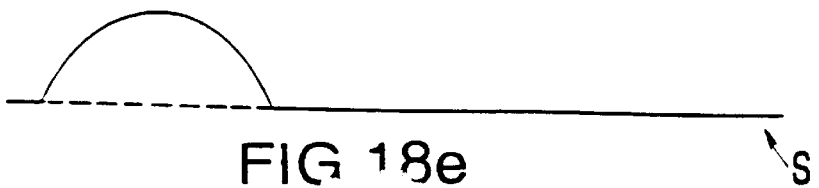

The result of the effect of the initial wave crest on the segment S in the first resulting frame is illustrated in FIG. 18(c). The points along the segment D1–D7 are displaced an amount D1–D7, respectively. The series of displacements D1–D7 defined by the wave of FIG. 18(a) is then shifted along the segment S (depending on the direction of travel of the wave) so that in the next frame of animation, the displacements are applied to different points along the segment S. In the example of FIG. 18, the wave is traveling to the right. As shown in FIG. 18(d), the displacements D1–D7 are shifted two points to the right so that they now are applied to points P3–P9 on the segment S. Thus, the segment in frame 2 appears as shown in FIG. 18(e). The amount of shift is determined by the velocity of travel for the wave, which is specified by the animator. The process is repeated for each successive frame of animation so as to create the appearance of a wave travelling through an object.

As in the case of an ordinary segment warp, a warp profile graph is used to modulate the effect of the wave path at each point along the segments affected segment or segments. For example, the warp profile graph may be drawn so that the wave effect may not be evident at all at the beginning of a segment but have an increasing effect as it travels along the segment. For example, the tail of a tadpole moving through the water would have no lateral wave movement at its root, but increasing movement toward the tail.

In one embodiment, the animator specifies four parameters to control the wave effect: i) the velocity of wave travel in terms of the number of points shifted per frame; ii) the direction of wave travel; iii) the starting point of the wave; and iv) the ending point of the wave. The wave path drawn by the animator is then interpolated based on these parameters to obtain the desired effect. For example, if the animator desires that the wave effect start and end on the segment so that it is present for the entire length of the animation, and that the velocity of wave travel is 1 point per frame, the length of the originally drawn wave path is adjusted by interpolation to be twice the length of the segment so that at the beginning of the animation, the entire first half of the wave is applied to the segment. Due to the movement of the wave through the segment during the animation, at the end of the animation, the first half has moved completely through the segment and the second half is entirely on the segment. Similarly, if the velocity is doubled, the wave path must be stretched by interpolation to four times the length. The wave effect may also be specified as starting or ending off of the segment, in which case the length would similarly be adjusted.

Wave warps are a very simple but powerful method for creating motion which appears organic and life-like.

Where the overall orientation of a character or object changes significantly during the course of an animation sequence (e.g., by more than 45° on any axis), simple segment warps may not create the desired effect. For example, in the segment warping of the tail shown in FIG. 12(b), if the fish were to turn over onto its side during the sequence, the segment warps as shown would move the tail up and down relative to the fish rather than side to side. In this situation, a "constructed segment warp" may be used.

For a constructed segment warp, a warp handle is indicated and a source warp path and source warp profile graph are drawn for each source pose of the character or object, with the source warp path appropriately related to the orientation of the object in that pose. Before the warp effect is applied, a constructed warp path and constructed warp profile graph are derived from the source warp paths and source warp profile graphs using weighted averaging in the same manner as for the constructed poses. Similarly, from the velocity profiles of the source warp paths, a constructed velocity profile is derived for the constructed warp path and may be modified as previously explained (the separate warp paths may need to be synchronized as described above so that they stay in sync regardless of the constructed pose). In this manner, the orientation of the constructed warp path is correctly related to the orientation of the object. The constructed warp path then produces the segment warp, as described above for simple segment warps.

For complex drawings using warps, it could be tedious if related warps were required for many segments. However, the concept may be readily extended to more complicated forms using a technique referred to as "spine warping." Spine warping is used to transform objects comprising multiple line segments with a single warp by applying the warp to a "spine" of the object. The term spine is used because a straight line is drawn roughly through the centerline of a group of line segments which may, for example, define the body of an animal. A warp is then applied to the spine and then transferred to the individual drawing segments. For spine warps, a straight line reference spine is drawn in each source pose used in a transformation and the animator selects the segments to be affected by the spine warp. For each segment selected, perpendicular distances from the points along the segment to the reference spine are calculated in order to transfer a warp applied to the spine to the selected segments. Constructed poses are generated in the manner previously described. The constructed poses include the straight line reference spine which is treated as an additional line in a source drawing but not displayed. The spine warp is then applied to the appropriate segments of the constructed poses, using the displacements between the reference spine and the warped spine and the perpendicular distances from the points along the segments to the reference spine.

Figure 19A:
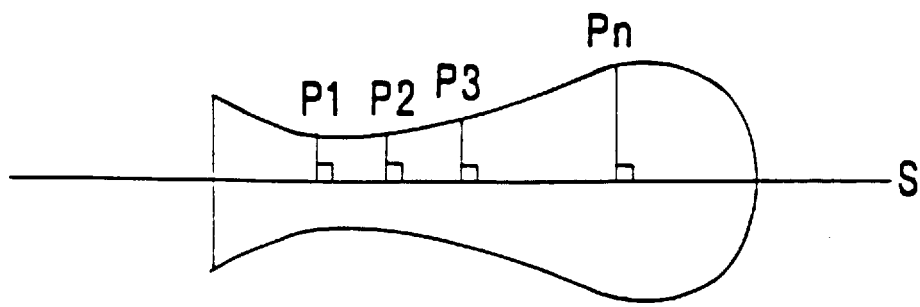
FIGS. 19(a)–(b) illustrate the spine warp of the present invention.
Figure 19B:
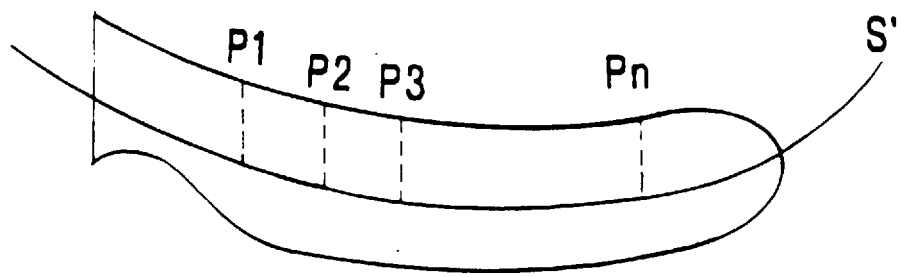

For example, FIG. 19(a) illustrates a constructed pose of a fish with a straight line spine, S. The spine is drawn by the animator but is not a part of the drawing that is displayed in the resulting animation frames. The perpendicular distances from points P1–Pn along the line segments to the spine are calculated and stored in order to transfer warps imposed on the spine to the segments of the drawing. A single warp path P is used in combination with a warp profile graph to warp the spine S. The spine may be warped by any of the above-described warps. FIG. 19(b) illustrates the warped spine S' (intended to be shown bending into the paper). For each line segment controlled by the spine warp, each point along the segment is displaced using the calculated displacement of the warped spine relative to the reference spine. In this manner, complex forms may be readily transformed in a simple manner using any of the above warping techniques.

A final aspect of the present invention also relates to creating constructed poses that maintain the proper coloring of source poses to enable the completely automatic painting of a series of animation drawings. In prior art computer painting methods of painting images, closed loops are drawn in two-dimensional space and filled in with color using a "seed" point. This technique is well known in the art of two-dimensional computer drawing and painting systems. The seed point acts as a starting point for the filling of closed loops in the color chosen by the animator. Painting proceeds outward from the point until the boundary of the loop is detected and filling the bounded area.

Figure 20A:
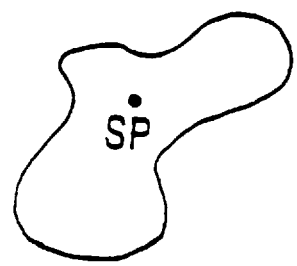
FIGS. 20(a)–(c) illustrate the problems with prior art seed point and flood-fill techniques for filling loops with color.
Figure 20B:
Figure 20C:
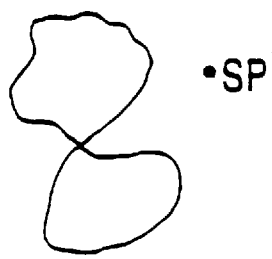

However, the seed fill technique has drawbacks when used for the automatic painting of stereo and two-dimensional images. For example, when the seed fill method is used for small loops, it may be difficult or impossible for the animator to place the seed point within a stereo loop in such a position that when the fill method is applied to the left and right eye two-dimensional projections of the stereo image, the seed point falls within each projected two-dimensional projected loop. The result is that for one or both eye projections, it may happen that the exterior of the loop is filled and not the interior. In addition, where a computer-assisted animation sequence of drawings is being generated and it is desired to automatically paint the series of drawings, the generated drawings may, by design, contain single loops that twist in three-dimensional space, thus creating several apparent loops in the two-dimensional projections of the transformed loop. In this situation, the seed point may fall entirely out of the loops, or only fill one of the two-dimensional loops. For example, a single loop with a seed point SP, shown in FIG. 20(a), may be twisted into a FIG. 8 when it is projected onto a plane creating two loops on the plane, shown in FIG. 20(b). The seed point SP may then fall within only one of the loops of the FIG. 8 as shown in FIG. 20(b), in which case only that portion will be filled. Alternatively, the seed point may fall outside the loop entirely, as shown in FIG. 20(c), in which case the area external to the loop will be colored.

Figure 21A:
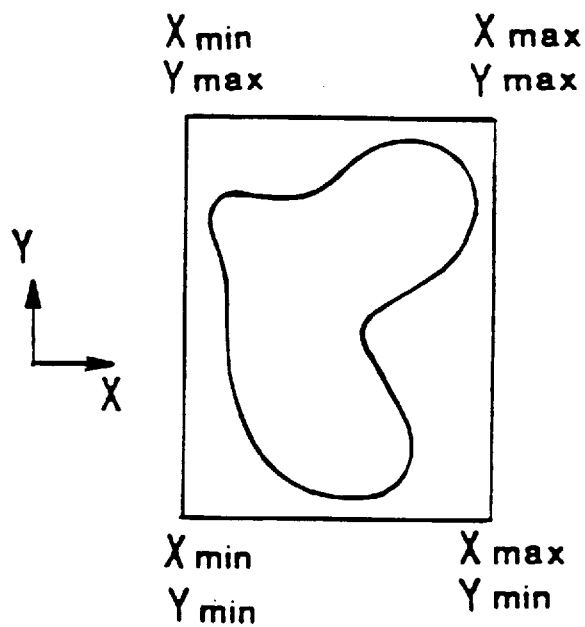
FIGS. 21(a)–(c) illustrate the fill masking technique of the present invention for overcoming the drawbacks of prior art seed point and flood-fill techniques.
Figure 21B:
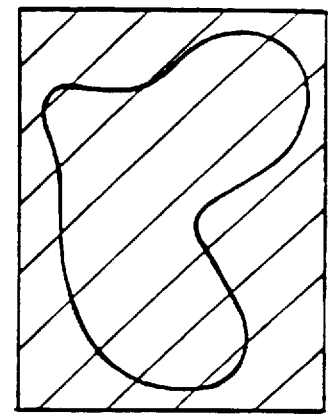
Figure 21C:
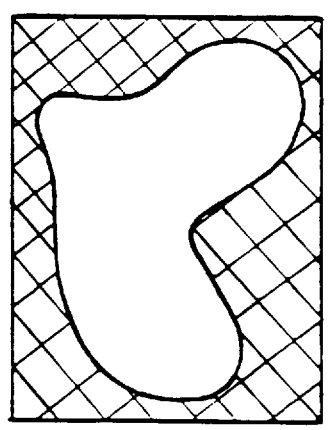

The present invention solves this problem using a technique referred to herein as "fill masking." Fill masking is a technique where a painted loop that is part of a stereo image is filled for display purposes by processing the loop prior to display in the following manner. First, the left and right eye projections of the stereo image of the loop on to a two-dimensional plane are ascertained. For each of these projections, in an off-screen buffer, a rectangle at least one pixel larger on each side than the projected loop is generated by determining the minimum and maximum x and y coordinates of the loop as shown in FIG. 5(a). FIG. 21(a) illustrates a single eye projection of a loop and rectangle. The entire rectangular area is generated in the color with which the loop is to be filled. The two-dimensional projection of the loop originally drawn by the animator is transferred to the buffer in the proper line color for the loop as shown in FIG. 21(b). A fill of the rectangle is then performed using the seed point and flood fill method discussed above. The seed point is generated just within any corner of the rectangle. For this fill, only the region bounded by the exterior of the loop and the rectangle is filled so that the interior of the loop is not filled and therefore remains in the original loop color as shown in FIG. 21(c). The fill consists of a code that makes this bounded region transparent when displayed so that only the loop remains visible in the proper color. After processing in this manner, which takes only a small fraction of a second, the rectangle is transferred from the buffer to the viewable display. It is known in the art of computer drawing systems to provide a "transparent" or "no-copy" color to indicate that the region filled with this color should not be copied to the screen from the buffer. All that appears is the loop in the proper color and the boundary line for the loop. For stereo loops, the process is repeated for each of the left and right eye projections of the loop.

This technique has been described for three-dimensional drawings but is equally applicable to the automatic painting of sequences of two-dimensional drawings.

The appendix contains the BASIC code for implementing the transformation graphs, space path, segment warps, wind warp, inertia warp, and wave warp of the present invention. This code is one example of the code that may be utilized and should not be construed as limiting. Those of ordinary skill in the art of will recognize that other code may be used. The invention has been described in greatest detail with respect to the particular embodiments and exemplary applications described above. However, the invention is not limited by this embodiment and examples, but is limited only by the scope of the appended claims.

I claim:

1. In a computer animation system, a process for creating animation drawings for use in an animation sequence depicting a transformation of an object, the process comprising:

selecting a plurality of source poses for said object, each said source pose comprising a predetermined form of said object, defining a pose transformation space dependent upon the number of said selected source poses, assigning each said source pose to a point within said pose transformation space, traversing a path within said pose transformation space using a computer input device, said computer selecting a plurality of points along said path, calculating, for each said selected point, the distance to each of said source pose points, generating, for each said selected point, a corresponding constructed pose, said constructed pose comprised of a composite of said source poses, wherein the contribution of each said source pose is determined by its distance to said selected point, and storing said constructed pose for use in an animation drawing.

2. The process of claim 1 wherein said pose transformation space is two-dimensional.

3. The process of claim 2 wherein said pose transformation space is a polygon and said source poses are assigned to vertices of said polygon.

4. The process of claim 3 wherein said pose transformation space is a triangle.

5. The process of claim 1 wherein said pose transformation space is three-dimensional.

6. The process of claim 5 wherein said pose transformation space is a polyhedron.

7. The process of claim 6 wherein said pose transformation space is substantially the shape of a tetrahedron and one source pose is assigned to each of the four vertices of said tetrahedron.

8. The process of claim 7 further comprising monitoring the rate of motion of said input device and using said rate to control the rate of change of an animation sequence comprising a transformation of the form of said object utilizing a plurality of said constructed poses.

9. The process of claim 8 further comprising displaying a velocity profile for said motion of said input device, said velocity profile comprising a graphical representation of said rate of change of said animation during said transformation of said object.

10. The process of claim 9 further comprising modifying said displayed velocity profile using said input device to adjust said rate of change of said animation sequence.

11. The process of claim 8 wherein each said constructed pose is used in a frame of animation in said animation sequence.

12. The process of claim 8 wherein said rate of change of said animation sequence is directly proportional to said rate of motion of said input device.

13. The process of claim 1 wherein said pose transformation space is six-dimensional.

14. The process of claim 1 further comprising monitoring the rate of motion of said input device and using said rate to control the rate of change of an animation sequence comprising a transformation of the form of said object utilizing a plurality of said constructed poses.

15. The process of claim 14 further comprising displaying a velocity profile for said motion of said input device, said velocity profile comprising a graphical representation of said rate of change of said animation during said transformation of said object.

16. The process of claim 15 further comprising modifying said displayed velocity profile using said input device to adjust said rate of change of said animation sequence.

17. The process of claim 14 wherein each said constructed pose is used in a frame of animation in said animation sequence.

18. The process of claim 14 wherein said rate of change of said animation sequence is directly proportional to said rate of motion of said input device.

19. The process of claim 1 further comprising displaying said constructed pose concurrently with said drawing of said path.

20. The process of claim 19 wherein each said constructed pose is displayed substantially at the same time said input device traverses the point corresponding to said constructed pose.

21. The process of claim 1 wherein said selected points are equally spaced in time in accordance with a predetermined, fixed time interval.

22. The process of claim 1 wherein said contribution of each said source pose is inversely proportional to its distance to said selected point.

23. The method of claim 1 further comprising displaying said traversed path.

24. In a computer animation system, a process for creating animation drawings for use in an animation sequence depicting a transformation of an object, the process comprising:

storing four source poses for said object, each said source pose comprising a predetermined form of said object, displaying a substantially tetrahedral pose transformation space using a stereoscopic display system, assigning each said source pose to a vertex of said pose transformation space, traversing a path within said pose transformation space using a computer input device, said computer selecting a plurality of points along said path spaced equally in time, calculating, for each said selected point, the distance to each of said vertices, generating, for each said selected point, a corresponding constructed pose, said constructed pose comprised of a composite of said source poses, wherein the contribution of each said source pose is inversely proportional to its distance to said selected point, and storing said constructed pose for use in an animation drawing.

25. The process of claim 24 further comprising monitoring the rate at which said input device traverses said path and using said rate to control the rate of said object transformation.

26. The process of claim 25 further comprising displaying a velocity profile for said motion of said input device, said velocity profile comprising a graphical representation of said rate of change of said animation sequence.

27. The process of claim 24 further comprising:

storing x, y, and z coordinates for each said selected point along said path, storing four source poses for a second object, displaying said substantially tetrahedral pose transformation space, assigning each said second object source pose to a vertex of said pose transformation space, determining, for each said selected point, the distance to each of said vertices of said second pose transformation space, generating, for each said selected point, a corresponding constructed pose for said second object, said constructed pose comprised of a composite of said second object source poses, wherein the contribution of each said second object source pose is inversely proportional to its distance to said selected point, storing said constructed pose for said second object for use in said animation drawing, said animation drawing comprising said first object constructed pose and said second object constructed pose corresponding to said selected point.

28. In a computer animation system, a process for creating animation drawings for use in an animation sequence depicting a synchronized transformation of a first object and a second object, the process comprising:

a) for each of said first and second objects, generating a plurality of constructed poses, wherein each said constructed pose is associated with a different point in time in said animation sequence and is generated in accordance with the following steps:

storing four source poses for said object, each said source pose comprising a predetermined form of said object, displaying a substantially tetrahedral pose transformation space using a stereoscopic display system, assigning each said source pose to a vertex of said pose transformation space, traversing a path within said pose transformation space using a computer input device, said computer selecting a plurality of points along said path spaced equally in time, calculating, for each said selected point, the distance to each of said vertices, generating, for each said selected point, a corresponding constructed pose, said constructed pose comprised of a composite of said source poses, wherein the contribution of each said source pose is inversely proportional to its distance to said selected point, and storing said constructed pose;

b) providing a velocity profile for each said plurality of constructed poses for said first and second objects, said velocity profile defining a relative rate of transformation of said object between adjacent ones of said constructed poses, c) selecting a first constructed pose for said first object for synchronization with a first constructed pose for said second object, c) assigning an animation frame identifier to said first constructed pose for said first object, said animation frame identifier establishing a point in time during said animation sequence for display of said first constructed pose for said first object, d) selecting said first constructed pose for said second object and assigning said frame identifier to said first constructed pose for said second object, and e) modifying said velocity profile for said plurality of constructed poses for said second object to adjust said relative rate of transformation of said second object so that said first constructed pose for said second object occurs at said point in time during said animation sequence for display of said first constructed pose for said first object.

29. The process of claim 28 wherein said velocity profile for said plurality of constructed poses for said second object is adjusted by interpolation.

30. The process of claim 28 further comprising selecting a second constructed pose for said first object for synchronization with a second constructed pose for said second object, assigning a second animation frame identifier to said second constructed pose for said first object, said second animation frame identifier establishing a point in time during said animation sequence for display of said second constructed pose for said first object, selecting said second constructed pose for said second object and assigning said second frame identifier to said second constructed pose for said second object, and modifying said velocity profile for said plurality of constructed poses for said second object to adjust said relative rate of transformation of said second object so that said second constructed pose for said second object occurs at said point in time during said animation sequence for display of said second constructed pose for said first object.

31. A user interface in a computer-assisted animation construction system for creating an animation sequence comprising a transformation of an object, said interface comprising:

a three-dimensional pose transformation space substantially in the shape of a tetrahedron, wherein each vertex of said tetrahedron is assigned a predetermined source pose of said object;

means for specifying a path within said pose transformation space;

means for detecting the position of said path-specifying means within said pose transformation space;

means for generating a constructed pose based on said position of said path-specifying means; and means for specifying a rate of transformation from a first said constructed pose corresponding to a first position of said path-specifying means to a second said constructed pose corresponding to a second position of said path-specifying means.

32. The interface of claim 31 further comprising means for monitoring the rate of motion of said input device and using said rate to control the rate of change of an animation sequence comprising a transformation of the form of said object utilizing a plurality of said constructed poses.

33. The interface of claim 32 further comprising means for displaying a velocity profile for said motion of said input device, said velocity profile comprising a graphical representation of said rate of change of said animation during said transformation of said object.

34. The interface of claim 33 further comprising means for modifying said displayed velocity profile using said input device to adjust said rate of change of said animation sequence.

35. The interface of claim 32 further comprising means for modifying said displayed velocity profile using said input device to adjust said rate of change of said animation sequence.

36. The interface of claim 32 wherein each said constructed pose is used in a frame of animation in said animation sequence.

37. The interface of claim 32 wherein said rate of change of said animation sequence is directly proportional to said rate of motion of said input device.

38. The interface of claim 31 further comprising means for displaying said constructed pose concurrently with said drawing of said path.

39. The interface of claim 38 wherein each said constructed pose is displayed substantially at the same time said input device traverses the point corresponding to said constructed pose.

40. The interface of claim 31 wherein said selected points are equally spaced in time in accordance with a predetermined, fixed time interval.

41. The interface of claim 31 wherein said contribution of each said source pose is inversely proportional to its distance to said selected point.

42. The interface of claim 31 further comprising means for displaying said specified path.

43. A computer animation system for creating animation drawings for use in an animation sequence depicting a transformation of an object comprising:

means for storing a plurality of source poses for an object for use in an animation sequence for said object, each said source pose comprising a predetermined form of said object, means for defining a pose transformation space dependent upon the number of said stored source poses, means for assigning each said source pose to a point within said pose transformation space, means for traversing a path within said pose transformation space using a computer input device, said computer selecting a plurality of points along said path, means for calculating, for each said selected point, the distance to each of said source pose points, means for generating, for each said selected point, a corresponding constructed pose, said constructed pose comprised of a composite of said source poses, wherein the contribution of each said source pose is determined by its distance to said selected point, and means for storing said constructed pose for use in an animation drawing.

44. A process for creating computer animation comprising:

automatically defining a pose transformation space dependent upon a predetermined number of selected source poses for an object, and assigning each of said source poses to a point within said pose transformation space;

detecting a path traversed by a computer input device moved within said pose transformation space;

selecting a plurality of points along said path;

generating, for each said selected point, a corresponding constructed pose, said constructed pose comprised of a composite of said source poses, wherein the contribution of each said source pose is determined by its distance to said selected point.

45. The method of claim 44 wherein said pose transformation space is three-dimensional.

46. The method of claim 44 wherein said pose transformation space is two-dimensional.

47. The method of claim 44 further comprising displaying said traversed path.

48. The method of claim 44 further comprising monitoring the rate of movement of said input device.

49. The method of claim 48 further comprising displaying a velocity profile for said movement of said input device.

50. The method of claim 44 further comprising displaying a sequence of said constructed poses.

51. The method of claim 44 wherein said selected points are spaced equally in time.

52. The method of claim 44 wherein said pose transformation space is substantially the shape of a polyhedron and each said source pose is assigned to a vertex of said polyhedron.

53. A computer animation system comprising:

a display device for displaying a predetermined two or three-dimensional shape and a cursor indicative of the position of a computer input device;

means for assigning a plurality of source poses for an object to distinct points within said predetermined shape;

means, responsive to said cursor position, for generating a plurality of constructed poses using two or more of said source poses, said display device displaying said constructed poses; and means for controlling the elapsed time between the display of consecutive ones of said plurality of constructed poses.

54. The system of claim 53 wherein said shape is a polyhedron.

55. The system of claim 53 wherein said shape is a tetrahedron.

56. The system of claim 53 wherein said shape is a triangle.

57. The system of claim 53 wherein said controlling means is responsive to the rate of movement of said cursor within said shape.

58. The system of claim 53 further comprising means for storing said constructed poses.

* * * * *